(12) United States Patent
Qasem et al.

(10) Patent No.: US 12,428,126 B1
(45) Date of Patent: *Sep. 30, 2025

(54) SUPERSONIC AIRCRAFT AIR FOIL GEOMETRY

(71) Applicant: KING FAHD UNIVERSITY OF PETROLEUM AND MINERALS, Dhahran (SA)

(72) Inventors: Naef Abduljalil Abdulrahman Qasem, Dhahran (SA); Zeyad M. Manaa, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/244,461

(22) Filed: Jun. 20, 2025

Related U.S. Application Data

(63) Continuation of application No. 18/679,738, filed on May 31, 2024, now Pat. No. 12,358,606.

(51) Int. Cl.
  *B64C 3/14* (2006.01)
  *B64C 30/00* (2006.01)

(52) U.S. Cl.
  CPC .............. *B64C 3/14* (2013.01); *B64C 30/00* (2013.01); *B64C 2003/146* (2013.01)

(58) Field of Classification Search
  CPC ...... B64C 3/14; B64C 30/00; B64C 2003/146
  See application file for complete search history.

(56) References Cited

U.S. PATENT DOCUMENTS

| | | |
|---|---|---|
| 6,378,802 B1 | 4/2002 | Saiz |
| 8,186,616 B2 | 5/2012 | Shepshelovich |
| 11,459,093 B2 | 10/2022 | Sikavi |
| 2011/0095137 A1 | 4/2011 | Tracy |

FOREIGN PATENT DOCUMENTS

| | | | | |
|---|---|---|---|---|
| CN | 101615216 B | | 1/2011 | |
| CN | 106741924 A | | 5/2017 | |
| CN | 108583847 A | | 9/2018 | |
| CN | 110758730 A | * | 2/2020 | ............... B64C 5/04 |
| CN | 113569360 A | | 10/2021 | |
| CN | 109190283 B | | 3/2023 | |

OTHER PUBLICATIONS

Minhee Kim, et al., "Experimental and Computational Study on Separation Control Performance of Synthetic Jets with Circular Exit", IJASS, 17(3), (Sep. 30, 2016), p. 296-314 (19 pages).

* cited by examiner

*Primary Examiner* — Joshua D Huson
*Assistant Examiner* — Peter A Taraschi
(74) *Attorney, Agent, or Firm* — Oblon, McClelland, Maier &Neustadt, L.L.P.

(57) ABSTRACT

An airfoil for an aircraft having an airfoil geometry. The airfoil geometry includes an upper surface and a lower surface, the upper and lower surfaces are in accordance with Cartesian coordinate values of X and Y. The Cartesian coordinate values of X and Y are non-dimensional values from 0 to 1 convertible to dimensional values by multiplying the Cartesian coordinate values of X and Y by a chord length of the airfoil. The upper surface and the lower surface form an enclosed airfoil shape. The aircraft is a supersonic aircraft, and the airfoil has a thickness-to-chord ratio of about 10%.

4 Claims, 16 Drawing Sheets

SUPERSONIC AIRCRAFT AIR FOIL GEOMETRY

CROSS-REFERENCE TO RELATED APPLICATIONS

The present application is a Continuation of U.S. application Ser. No. 18/679,738, now allowed, having a filing date of May 31, 2024.

BACKGROUND

Technical Field

The present disclosure is directed to an airfoil geometry, and more particularly, relates to an airfoil for an aircraft having an airfoil geometry for superior aerodynamic performance, especially in a supersonic domain.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Airfoil, in general, is a structure that is meant to manipulate the flow of a fluid around it to get a reaction, which, in aerospace applications, is to generate aerodynamic lift. Airfoils are used in wings section of an airplane and also may be used in other aerospace sector applications such as, but not limited to, wind turbines, spoilers, and helicopters. The airflow response when disturbed is something natural that is leveraged by the airfoil's shape design to get the desired aerodynamic forces. Airfoil design and jet engines are responsible for driving modern aircraft. Previously, development of airfoils was empirical. Early tests showed efficiency of rounded, sharp leading edges, and trailing edges of an airfoil. The demand for more aerodynamic performance in aircraft wings led to tests of numerous wings with improved shapes. These tests contributed significantly to the development of the airfoil design. In particular, the tests and research conducted by national advisory committee for aeronautics (NACA) is vital.

There are major distinctions between fighter and civil aircraft, especially when it comes to the airfoil and wing design. Fighter airfoils have developed, with an emphasis on enhancing aerodynamic performance, stealth, combat agility, and maneuverability in order to meet the demands of supersonic flight as a crucial point for missions like rapid interception of enemy aircraft and high-speed delivery of weapons. For such purposes, fighters commonly have pointy, compact shapes and smaller delta-shaped wings. Fighter aircraft airfoils have later maximal thickness locations, smaller leading-edge radii, and diamond-shaped thickness distributions. In contrast, civil aircraft have traditionally used a conventional layout to prioritize fuel efficiency and passenger comfort. Numerous factors influence the design of airfoil shapes used in commercial civil aviation. Among these are the high lift and low drag requirements in particular operating environments. To improve aerodynamic performance and fuel efficiency, features like engine pylons, flap track fairings, and wing-body fairings are frequently added. Additionally, civil aircraft design emphasizes the minimization of direct operating costs to maximize airline profits, influencing wing design choices.

In common, the technical aspects used for the design of airfoil shapes for both fighter aircraft and commercial civil aviation include aerodynamic properties like lift-to-drag ratio and shape area. To get the best of these metrics, CFD, along with methods like complex shape parameterization, surrogate models, machine learning, and effective gradient computing, have been the pillars for the advancement of aerodynamic shape optimization.

To design a new airfoil, some methods could be useful, including experimental and numerical ones, by changing the airfoil shape and dimensions such as chord length, upper surface length, curvature, and lower surface shape. However, many airfoil shapes must be investigated for aerodynamic forces such as, but not limited to, lift, and drag. To tackle this issue, the implementation of refinement techniques are used to identify a desired design. The refinement of numerous parameters affecting the aerodynamic shape was made possible by computer capabilities, which allowed for iterative performance improvements.

Aerodynamic shape optimization (ASO) has grown significantly over time, incorporating several innovations. Instead of having a single, conclusive solution, a design of an aircraft including airfoils, is characterized by an iterative and interrelated process. Due to the interdependence of various components, a thorough examination of the design space is required, where iterative adjustments and improvements are made. Multiple parameterization techniques, such as Bezier curves, B-splines, and PARSEC method have been used to characterize airfoils. Presently, aerodynamicists and designers utilize hand tools to iterate. A convex optimization scheme that utilize linear flow theory as a mathematical base for the convex design problem leveraging the super beneficial characteristics of convex refinement have been used. Furthermore, polynomial airfoil parameterization and cubic splines parameterization have been utilized, while still holding the convexity behavior.

Convex refinement techniques have drawn a lot of interest in research, such as control theory and machine learning. When functioning within the parameters of convex functions that may be used to describe simplified physics, convex refinement offers the advantage of solving for verified global improvements. This characteristic ensures that the solutions found for the given problem are best both locally and globally. However, in specific cases such as aerodynamics, the limitations of the convex constraint and objective functions exclude the complexities modeled by the partial differential equations that may describe the flow field with more comprehensive and higher fidelity representation.

Computational fluid dynamics (CFD) has a great role in the advancement of airfoil design. Using the governing equations and turbulence models solved on discrete meshes, CFD allows for accurate prediction of aerodynamic forces on airfoils. This allows numerous airfoil geometries to be tested through simulations prior to experimental wind tunnel testing. CFD, along with methods like complex shape parameterization, surrogate models, and effective gradient computing. However, airfoil development needs a lot of improvement to adhere to modern day requirements.

Therefore, a need arises for a more efficient and aerodynamic airfoil geometry, suitable to be applied into various supersonic and subsonic aircrafts.

Accordingly, it is one object of the present disclosure to provide an airfoil with an airfoil geometry that may circumvent the aforementioned drawbacks such as low efficiency and poor aerodynamic performance.

SUMMARY

In an exemplary embodiment, an airfoil for an aircraft having an airfoil geometry is described. The airfoil geometry includes an upper surface and a lower surface, the upper and lower surfaces are in accordance with Cartesian coordinate values of X and Y set forth in Table 1. The Cartesian coordinate values of X and Y are non-dimensional values from 0 to 1 convertible to dimensional values by multiplying the Cartesian coordinate values of X and Y by a chord length of the airfoil. The upper surface and the lower surface form an enclosed airfoil shape.

In some embodiments, the aircraft is a supersonic aircraft.

In some embodiments, the airfoil has a thickness-to-chord ratio of about 10% and wherein a cross-sectional area of the airfoil adheres to NACA 64a210.

In some embodiments, the airfoil has a weight adheres to NACA 64a210.

In some embodiments, the airfoil has an angle-of-attack, wherein the angle-of-attack is between 0° and 30°.

In some embodiments, the angle-of-attack is about 9°.

In some embodiments, the angle-of-attack is about 9.3908°.

In some embodiments, the airfoil has a Mach number, and the Mach number is between 1.5 and 2.5.

In some embodiments, the airfoil has the angle-of-attack of about 2° and wherein the Mach number is 2.5.

In some embodiments, the airfoil has a leading edge and a trailing edge, and the leading has a shape that generates an attached oblique shockwave around the airfoil under a supersonic condition.

In another exemplary embodiment, a supersonic aircraft having a plurality of wings is described. The wings have an airfoil geometry including an upper surface represented by a first polynomial equation having a first coefficient and a second coefficient. The airfoil geometry further includes a lower surface represented by a second polynomial equation having a third coefficient and a fourth coefficient. The upper surface and the lower surface define a closed airfoil shape.

In some embodiments, the first polynomial equation is, $$y_u(x) = -(a_1+a_2)x^3 + a_2 x^2 + a_1 x$$

and the second polynomial equation is, $$y_l(x) = -(b_1+b_2)x^3 + b_2 x^2 + b_1 x$$

where, $y_u$ represents the upper surface and $y_l$ represents the lower surface; where, $a_1$ is the first coefficient, $a_2$ is the second coefficient, $b_1$ is the third coefficient, and $b_2$ is the fourth coefficient, where, the first coefficient is about 0.1562, the second coefficient is about 0.0821, the third coefficient is about −0.3058, and the fourth coefficient is about 0.6749.

In some embodiments, the airfoil has a thickness-to-chord ratio of about 10%, a cross-sectional area that adheres to NACA 64a210, and a weight that adheres to NACA 64a210.

In some embodiments, the airfoil has a Mach number, an angle-of-attack is about 2°, and the Mach number is 2.5.

In some embodiments, the airfoil has the angle-of-attack of about 9.3908° and a Mach number between 1.5 and 2.5.

In some embodiments, the airfoil has a leading edge and a trailing edge, the leading edge has a shape that generates an attached oblique shockwave around the airfoil geometry under a supersonic condition.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
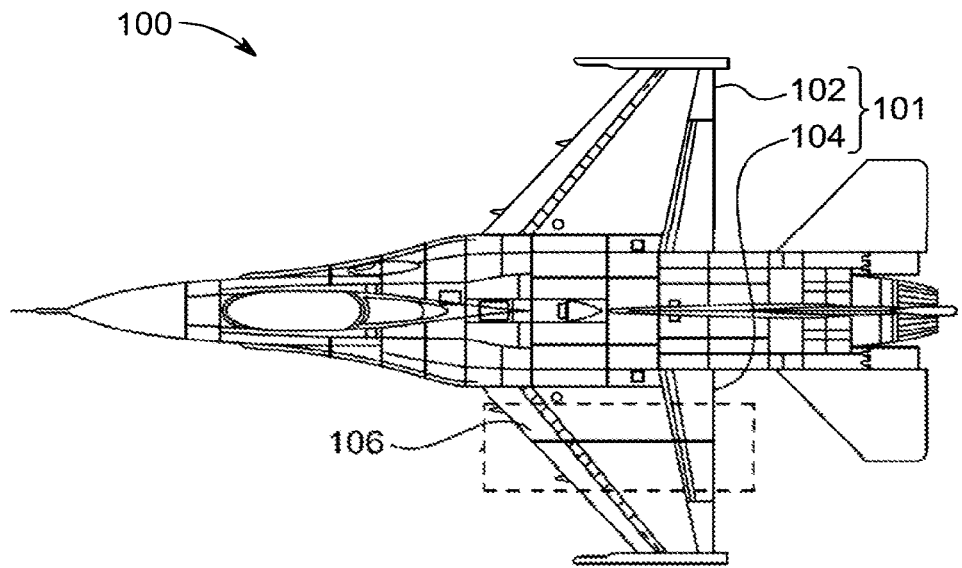
FIG. 1A is a schematic diagram of an aircraft having an airfoil, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of the present disclosure are directed to an airfoil for an aircraft having an airfoil geometry. Typically, airfoil geometry is a vital parameter for aircraft performance as a thrust of the aircraft is generated depending upon the airfoil geometry. The present disclosure aims to provide an improved airfoil geometry to increase aircraft performance and reduce fuel consumption. Computational fluid dynamics (CFD), virtual three dimensional modelling and software testing are used to verify and test a performance of the airfoil geometry of the present disclosure.

Referring to FIG. 1A, a schematic diagram of an aircraft 100 having at least two wings 101 is illustrated, according to certain embodiments. In particular, the aircraft 100 is a supersonic aircraft. In general, a supersonic aircraft is an aeronautical machinery that is capable of flying faster than speed of sound. The speed of sound generally varies slightly depending on temperature, humidity, and altitude. In some embodiments, the aircraft 100 includes more than two wings 101. According to the present disclosure, the aircraft 100 further includes a first wing 102 and a second wing 104. In an embodiment of the present disclosure, the first and the second wings 102, 104 include an airfoil 106 having an airfoil geometry 107 (shown in FIG. 1B). In general, airfoil is a structure designed and configured to manipulate a flow of a fluid around the airfoil to get a reaction, such as, in aerospace applications, and the reaction translates to aerodynamic lift. Airflow response is disrupted by the airfoil 106 and subsequent reaction is leveraged by a shape of the airfoil 106 to generate desired amount of aerodynamic lift.

Figure 1B:
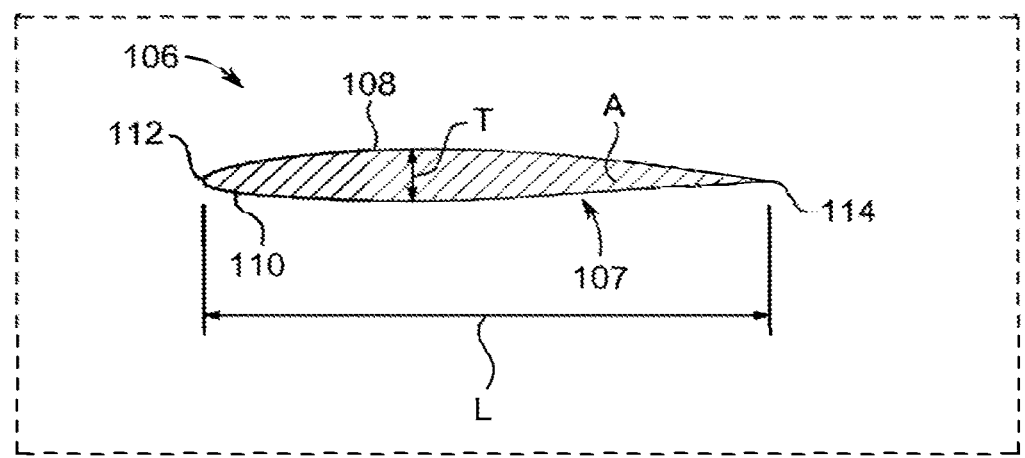
FIG. 1B is a schematic cross-sectional and enlarged view of the airfoil of the aircraft, according to certain embodiments.

Referring to FIG. 1B, an enlarged and cross sectional view of the airfoil 106 of the aircraft 100 having an airfoil geometry 107 is illustrated, according to certain embodiments According to the present disclosure, the airfoil geometry 107 includes an upper surface 108 represented by a first polynomial equation having a first coefficient $a_1$ and a second coefficient $a_2$. Further, the airfoil geometry 107 of the airfoil 106 includes a lower surface 110 represented by a second polynomial equation having a third coefficient $b_1$ and a fourth coefficient $b_1$. As such, the upper surface 108 and the lower surface 110 form an enclosed airfoil shape. In other words, the upper surface 108 and the lower surface 110 define a closed airfoil shape.

The first polynomial equation pertaining to the upper surface 108 of the airfoil 106 is, $$y_u(x) = -(a_1+a_2)x^3 + a_2 x^2 + a_1 x$$

where, $y_u$ represents the upper surface 108, $a_1$ is the first coefficient, and $a_2$ is the second coefficient.

The second polynomial equation pertaining to the lower surface 110 of the airfoil 106 is, $$y_l(x) = -(b_1+b_2)x^3 + b_2 x^2 + b_1 x$$

where, $y_l$ represents the lower surface 110 $b_1$ is the third coefficient, and $b_2$ is the fourth coefficient. Furthermore, the first coefficient $a_1$ is about 0.1562, the second coefficient $a_2$ is about 0.0821, the third coefficient $b_1$ is about −0.3058, and the fourth coefficient $b_2$ is about 0.6749.

The upper surface 108 may be alternatively referred to as "suction surface". The upper surface 108 relates to a high velocity and low static pressure surface. In contrast, the lower surface 110 may be referred to as the "pressure surface" having relatively higher static pressure and lower velocity, in comparison to the upper surface 108. In addition, a distance between the upper surface 108 and the lower surface 110 defines a thickness 'T' of the airfoil 106. In some embodiments, the airfoil 106 includes a leading edge 112 and a trailing edge 114. Further, the leading edge 112 has a shape that generates an attached oblique shockwave around the airfoil 106 under a supersonic condition. In other words, when the aircraft 100 having the airfoil 106 is moving at a supersonic speed, air around the airfoil 106 compresses, such that, pressure, temperature, and density of the air increases instantaneously, and produces oblique shockwaves around the airfoil 106. In addition, a distance between the leading edge 112 and the trailing edge 114 defines a chord length 'L' of the airfoil 106. In some embodiments, the airfoil 106 has a thickness-to-chord ratio of about 10%, as such, a cross-sectional area 'A' of the airfoil 106 adheres to NACA 64a210. Further, the airfoil 106 has a weight and the weight adheres to NACA 64a210. In general, NACA 64a210 refers to a standard airfoil as devised by national advisory committee for aeronautics (NACA).

In an aspect, the airfoil 106 has an angle-of-attack (AOA). In general, the angle-of-attack refers to an angle between a chord line of the airfoil 106 and on-coming air. In one embodiment, the angle-of-attack is between 0° and 30°. In another embodiment, the angle-of-attack is about 9°. In yet another embodiment, the angle-of-attack is about 9.3908°. In addition to the angle-of-attack, the airfoil 106 has a Mach number. In one embodiment, the Mach number is between 1.5 and 2.5. In another embodiment, the airfoil 106 has the angle-of-attack of about 2° and the Mach number is 2.5. Typically, Mach number of 1 or greater refers to a supersonic velocity.

Figure 2:
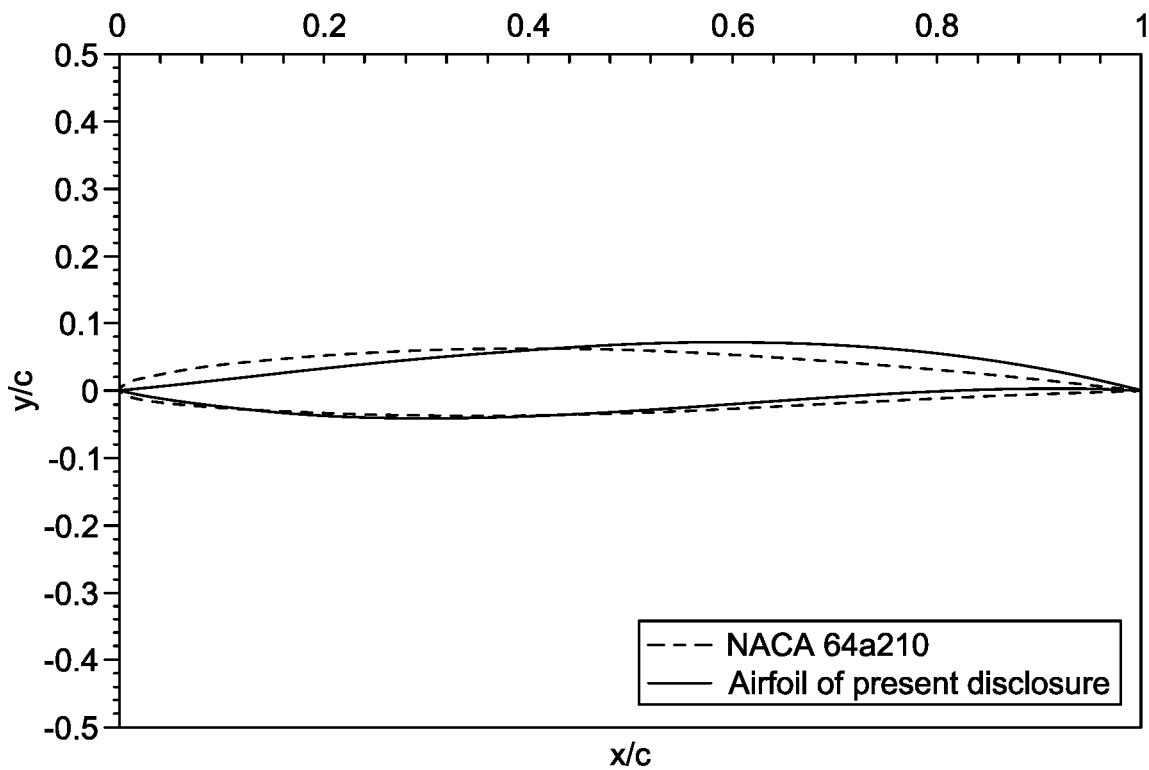
FIG. 2 shows comparison of an airfoil geometry of the airfoil with a NACA 64a210 airfoil geometry, according to certain embodiments.

Referring to FIG. 2, a comparison between the airfoil geometry 107 and NACA 64a210 airfoil geometry is illustrated, according to certain embodiments. As can be seen from FIG. 2, the airfoil geometry 107 is configured to have same cross-sectional area and thickness as of the NACA 64a210 airfoil. However, in some embodiments, the airfoil 106 is configured to have different airfoil geometry, having the upper surface 108 and the lower surface 110. The upper and the lower surfaces 108, 110 are in accordance with cartesian coordinate values of X and Y set forth in Table 1, provided below for reference.

TABLE 1 coordinate values of X and Y for airfoil 106

| Point No. | Lower X | Lower Y | Upper X | Upper Y |
|---|---|---|---|---|
| 1 | 0 | 0 | 0 | 0 |
| 2 | 0.005025126 | −0.00151946 | 0.005025126 | 0.000787112 |
| 3 | 0.010050251 | −0.003005118 | 0.010050251 | 0.001578189 |
| 4 | 0.015075377 | −0.004457256 | 0.015075377 | 0.002373049 |
| 5 | 0.020100503 | −0.005876155 | 0.020100503 | 0.003171512 |
| 6 | 0.025125628 | −0.007262095 | 0.025125628 | 0.003973395 |
| 7 | 0.030150754 | −0.008615358 | 0.030150754 | 0.004778517 |
| 8 | 0.035175879 | −0.009936224 | 0.035175879 | 0.005586697 |
| 9 | 0.040201005 | −0.011224975 | 0.040201005 | 0.006397753 |
| 10 | 0.045226131 | −0.012481892 | 0.045226131 | 0.007211504 |
| 11 | 0.050251256 | −0.013707255 | 0.050251256 | 0.008027768 |
| 12 | 0.055276382 | −0.014901346 | 0.055276382 | 0.008846364 |
| 13 | 0.060301508 | −0.016064445 | 0.060301508 | 0.00966711 |
| 14 | 0.065326633 | −0.017196835 | 0.065326633 | 0.010489826 |
| 15 | 0.070351759 | −0.018298795 | 0.070351759 | 0.011314328 |
| 16 | 0.075376884 | −0.019370606 | 0.075376884 | 0.012140437 |
| 17 | 0.08040201 | −0.020412551 | 0.08040201 | 0.012967971 |
| 18 | 0.085427136 | −0.021424909 | 0.085427136 | 0.013796747 |
| 19 | 0.090452261 | −0.022407962 | 0.090452261 | 0.014626585 |
| 20 | 0.095477387 | −0.023361991 | 0.095477387 | 0.015457304 |
| 21 | 0.100502513 | −0.024287277 | 0.100502513 | 0.016288721 |
| 22 | 0.105527638 | −0.0251841 | 0.105527638 | 0.017120656 |
| 23 | 0.110552764 | −0.026052742 | 0.110552764 | 0.017952926 |
| 24 | 0.115577889 | −0.026893484 | 0.115577889 | 0.018785351 |
| 25 | 0.120603015 | −0.027706608 | 0.120603015 | 0.019617748 |
| 26 | 0.125628141 | −0.028492392 | 0.125628141 | 0.020449938 |
| 27 | 0.130653266 | −0.02925112 | 0.130653266 | 0.021281737 |
| 28 | 0.135678392 | −0.029983072 | 0.135678392 | 0.022112964 |
| 29 | 0.140703518 | −0.030688529 | 0.140703518 | 0.022943439 |
| 30 | 0.145728643 | −0.031367771 | 0.145728643 | 0.02377298 |
| 31 | 0.150753769 | −0.032021081 | 0.150753769 | 0.024601404 |
| 32 | 0.155778894 | −0.032648739 | 0.155778894 | 0.025428532 |
| 33 | 0.16080402 | −0.033251025 | 0.16080402 | 0.026254181 |
| 34 | 0.165829146 | −0.033828222 | 0.165829146 | 0.027078169 |
| 35 | 0.170854271 | −0.03438061 | 0.170854271 | 0.027900316 |
| 36 | 0.175879397 | −0.034908469 | 0.175879397 | 0.02872044 |
| 37 | 0.180904523 | −0.035412082 | 0.180904523 | 0.029538359 |
| 38 | 0.185929648 | −0.035891729 | 0.185929648 | 0.030353893 |
| 39 | 0.190954774 | −0.036347691 | 0.190954774 | 0.031166859 |
| 40 | 0.195979899 | −0.036780249 | 0.195979899 | 0.031977076 |
| 41 | 0.201005025 | −0.037189685 | 0.201005025 | 0.032784362 |
| 42 | 0.206030151 | −0.037576278 | 0.206030151 | 0.033588537 |
| 43 | 0.211055276 | −0.037940311 | 0.211055276 | 0.034389419 |
| 44 | 0.216080402 | −0.038282064 | 0.216080402 | 0.035186826 |
| 45 | 0.221105528 | −0.038601818 | 0.221105528 | 0.035980576 |
| 46 | 0.226130653 | −0.038899854 | 0.226130653 | 0.036770489 |
| 47 | 0.231155779 | −0.039176453 | 0.231155779 | 0.037556383 |
| 48 | 0.236180905 | −0.039431897 | 0.236180905 | 0.038338077 |
| 49 | 0.24120603 | −0.039666466 | 0.24120603 | 0.039115388 |
| 50 | 0.246231156 | −0.039880441 | 0.246231156 | 0.039888136 |
| 51 | 0.251256281 | −0.040074104 | 0.251256281 | 0.040656139 |
| 52 | 0.256281407 | −0.040247735 | 0.256281407 | 0.041419216 |
| 53 | 0.261306533 | −0.040401615 | 0.261306533 | 0.042177185 |
| 54 | 0.266331658 | −0.040536025 | 0.266331658 | 0.042929864 |
| 55 | 0.271356784 | −0.040651247 | 0.271356784 | 0.043677073 |
| 56 | 0.27638191 | −0.040747561 | 0.27638191 | 0.04441863 |
| 57 | 0.281407035 | −0.040825249 | 0.281407035 | 0.045154353 |
| 58 | 0.286432161 | −0.040884591 | 0.286432161 | 0.045884061 |
| 59 | 0.291457286 | −0.040925869 | 0.291457286 | 0.046607572 |
| 60 | 0.296482412 | −0.040949363 | 0.296482412 | 0.047324705 |

TABLE 1-continued coordinate values of X and Y for airfoil 106

| Point No. | Lower X | Lower Y | Upper X | Upper Y |
|---|---|---|---|---|
| 61 | 0.301507538 | −0.040955354 | 0.301507538 | 0.048035279 |
| 62 | 0.306532663 | −0.040944124 | 0.306532663 | 0.048739112 |
| 63 | 0.311557789 | −0.040915954 | 0.311557789 | 0.049436023 |
| 64 | 0.316582915 | −0.040871123 | 0.316582915 | 0.050125829 |
| 65 | 0.32160804 | −0.040809915 | 0.32160804 | 0.050808351 |
| 66 | 0.326633166 | −0.040732609 | 0.326633166 | 0.051483406 |
| 67 | 0.331658291 | −0.040639486 | 0.331658291 | 0.052150812 |
| 68 | 0.336683417 | −0.040530829 | 0.336683417 | 0.052810389 |
| 69 | 0.341708543 | −0.040406916 | 0.341708543 | 0.053461955 |
| 70 | 0.346733668 | −0.040268031 | 0.346733668 | 0.054105328 |
| 71 | 0.351758794 | −0.040114453 | 0.351758794 | 0.054740327 |
| 72 | 0.35678392 | −0.039946463 | 0.35678392 | 0.055366771 |
| 73 | 0.361809045 | −0.039764343 | 0.361809045 | 0.055984477 |
| 74 | 0.366834171 | −0.039568374 | 0.366834171 | 0.056593266 |
| 75 | 0.371859296 | −0.039358837 | 0.371859296 | 0.057192954 |
| 76 | 0.376884422 | −0.039136012 | 0.376884422 | 0.057783361 |
| 77 | 0.381909548 | −0.038900181 | 0.381909548 | 0.058364306 |
| 78 | 0.386934673 | −0.038651625 | 0.386934673 | 0.058935606 |
| 79 | 0.391959799 | −0.038390625 | 0.391959799 | 0.059497081 |
| 80 | 0.396984925 | −0.038117461 | 0.396984925 | 0.060048548 |
| 81 | 0.40201005 | −0.037832415 | 0.40201005 | 0.060589827 |
| 82 | 0.407035176 | −0.037535768 | 0.407035176 | 0.061120736 |
| 83 | 0.412060302 | −0.037227801 | 0.412060302 | 0.061641093 |
| 84 | 0.417085427 | −0.036908794 | 0.417085427 | 0.062150718 |
| 85 | 0.422110553 | −0.03657903 | 0.422110553 | 0.062649428 |
| 86 | 0.427135678 | −0.036238788 | 0.427135678 | 0.063137042 |
| 87 | 0.432160804 | −0.03588835 | 0.432160804 | 0.063613379 |
| 88 | 0.43718593 | −0.035527997 | 0.43718593 | 0.064078257 |
| 89 | 0.442211055 | −0.03515801 | 0.442211055 | 0.064531495 |
| 90 | 0.447236181 | −0.03477867 | 0.447236181 | 0.064972911 |
| 91 | 0.452261307 | −0.034390258 | 0.452261307 | 0.065402324 |
| 92 | 0.457286432 | −0.033993054 | 0.457286432 | 0.065819552 |
| 93 | 0.462311558 | −0.033587341 | 0.462311558 | 0.066224415 |
| 94 | 0.467336683 | −0.033173399 | 0.467336683 | 0.06661673 |
| 95 | 0.472361809 | −0.032751509 | 0.472361809 | 0.066996316 |
| 96 | 0.477386935 | 0.032321952 | 0.477386935 | 0.067362991 |
| 97 | 0.48241206 | −0.031885009 | 0.48241206 | 0.067716575 |
| 98 | 0.487437186 | −0.031440961 | 0.487437186 | 0.068056885 |
| 99 | 0.492462312 | −0.030990089 | 0.492462312 | 0.068383741 |
| 100 | 0.497487437 | −0.030532674 | 0.497487437 | 0.06869696 |
| 101 | 0.502512563 | −0.030068997 | 0.502512563 | 0.068996362 |
| 102 | 0.507537688 | −0.029599339 | 0.507537688 | 0.069281764 |
| 103 | 0.512562814 | −0.029123982 | 0.512562814 | 0.069552986 |
| 104 | 0.51758794 | −0.028643205 | 0.51758794 | 0.069809846 |
| 105 | 0.522613065 | −0.028157291 | 0.522613065 | 0.070052163 |
| 106 | 0.527638191 | −0.02766652 | 0.527638191 | 0.070279754 |
| 107 | 0.532663317 | −0.027171173 | 0.532663317 | 0.070492439 |
| 108 | 0.537688442 | −0.026671532 | 0.537688442 | 0.070690036 |
| 109 | 0.542713568 | −0.026167877 | 0.542713568 | 0.070872364 |
| 110 | 0.547738693 | −0.025660489 | 0.547738693 | 0.071039241 |
| 111 | 0.552763819 | −0.025149649 | 0.552763819 | 0.071190485 |
| 112 | 0.557788945 | 0.024635638 | 0.557788945 | 0.071325916 |
| 113 | 0.56281407 | −0.024118738 | 0.56281407 | 0.071445352 |
| 114 | 0.567839196 | −0.023599229 | 0.567839196 | 0.071548612 |
| 115 | 0.572864322 | −0.023077393 | 0.572864322 | 0.071635513 |
| 116 | 0.577889447 | −0.02255351 | 0.577889447 | 0.071705874 |
| 117 | 0.582914573 | −0.022027861 | 0.582914573 | 0.071759515 |
| 118 | 0.587939698 | −0.021500727 | 0.587939698 | 0.071796253 |
| 119 | 0.592964824 | −0.02097239 | 0.592964824 | 0.071815908 |
| 120 | 0.59798995 | −0.020443131 | 0.59798995 | 0.071818297 |
| 121 | 0.603015075 | −0.01991323 | 0.603015075 | 0.071803239 |
| 122 | 0.608040201 | −0.019382968 | 0.608040201 | 0.071770553 |
| 123 | 0.613065327 | −0.018852627 | 0.613065327 | 0.071720057 |
| 124 | 0.618090452 | −0.018322487 | 0.618090452 | 0.07165157 |
| 125 | 0.623115578 | −0.01779283 | 0.623115578 | 0.071564911 |
| 126 | 0.628140704 | −0.017263936 | 0.628140704 | 0.071459897 |
| 127 | 0.633165829 | 0.016736087 | 0.633165829 | 0.071336348 |
| 128 | 0.638190955 | 0.016209563 | 0.638190955 | 0.071194082 |
| 129 | 0.64321608 | −0.015684646 | 0.64321608 | 0.071032917 |
| 130 | 0.648241206 | −0.015161617 | 0.648241206 | 0.070852673 |
| 131 | 0.653266332 | −0.014640756 | 0.653266332 | 0.070653167 |
| 132 | 0.658291457 | −0.014122344 | 0.658291457 | 0.070434218 |
| 133 | 0.663316583 | −0.013606664 | 0.663316583 | 0.070195646 |
| 134 | 0.668341709 | −0.013093995 | 0.668341709 | 0.069937267 |
| 135 | 0.673366834 | −0.012584618 | 0.673366834 | 0.069658901 |

TABLE 1-continued coordinate values of X and Y for airfoil 106

| Point No. | Lower X | Lower Y | Upper X | Upper Y |
|---|---|---|---|---|
| 136 | 0.67839196 | −0.012078816 | 0.67839196 | 0.069360367 |
| 137 | 0.683417085 | −0.011576868 | 0.683417085 | 0.069041482 |
| 138 | 0.688442211 | −0.011079055 | 0.688442211 | 0.068702066 |
| 139 | 0.693467337 | −0.01058566 | 0.693467337 | 0.068341937 |
| 140 | 0.698492462 | −0.010096962 | 0.698492462 | 0.067960913 |
| 141 | 0.703517588 | −0.009613243 | 0.703517588 | 0.067558814 |
| 142 | 0.708542714 | −0.009134784 | 0.708542714 | 0.067135457 |
| 143 | 0.713567839 | −0.008661865 | 0.713567839 | 0.066690662 |
| 144 | 0.718592965 | −0.008194769 | 0.718592965 | 0.066224246 |
| 145 | 0.72361809 | −0.007733775 | 0.72361809 | 0.065736028 |
| 146 | 0.728643216 | −0.007279165 | 0.728643216 | 0.065225827 |
| 147 | 0.733668342 | −0.00683122 | 0.733668342 | 0.064693462 |
| 148 | 0.738693467 | −0.006390221 | 0.738693467 | 0.06413875 |
| 149 | 0.743718593 | −0.005956448 | 0.743718593 | 0.063561511 |
| 150 | 0.748743719 | −0.005530184 | 0.748743719 | 0.062961563 |
| 151 | 0.753768844 | −0.005111708 | 0.753768844 | 0.062338724 |
| 152 | 0.75879397 | −0.004701303 | 0.75879397 | 0.061692814 |
| 153 | 0.763819095 | −0.004299248 | 0.763819095 | 0.06102365 |
| 154 | 0.768844221 | −0.003905825 | 0.768844221 | 0.060331051 |
| 155 | 0.773869347 | −0.003521316 | 0.773869347 | 0.059614836 |
| 156 | 0.778894472 | −0.003146 | 0.778894472 | 0.058874823 |
| 157 | 0.783919598 | −0.002780159 | 0.783919598 | 0.058110831 |
| 158 | 0.788944724 | −0.002424075 | 0.788944724 | 0.057322679 |
| 159 | 0.793969849 | −0.002078027 | 0.793969849 | 0.056510184 |
| 160 | 0.798994975 | −0.001742298 | 0.798994975 | 0.055673166 |
| 161 | 0.804020101 | −0.001417167 | 0.804020101 | 0.054811443 |
| 162 | 0.809045226 | −0.001102917 | 0.809045226 | 0.053924833 |
| 163 | 0.814070352 | −0.000799828 | 0.814070352 | 0.053013155 |
| 164 | 0.819095477 | −0.000508181 | 0.819095477 | 0.052076228 |
| 165 | 0.824120603 | −0.000228257 | 0.824120603 | 0.05111387 |
| 166 | 0.829145729 | 3.96631094752298e−05 | 0.829145729 | 0.0501259 |
| 167 | 0.834170854 | 0.000295298 | 0.834170854 | 0.049112136 |
| 168 | 0.83919598 | 0.000538366 | 0.83919598 | 0.048072396 |
| 169 | 0.844221106 | 0.000768587 | 0.844221106 | 0.047006501 |
| 170 | 0.849246231 | 0.00098568 | 0.849246231 | 0.045914267 |
| 171 | 0.854271357 | 0.001189364 | 0.854271357 | 0.044795513 |
| 172 | 0.859296482 | 0.001379357 | 0.859296482 | 0.043650058 |
| 173 | 0.864321608 | 0.001555379 | 0.864321608 | 0.042477721 |
| 174 | 0.869346734 | 0.001717149 | 0.869346734 | 0.04127832 |
| 175 | 0.874371859 | 0.001864386 | 0.874371859 | 0.040051674 |
| 176 | 0.879396985 | 0.001996808 | 0.879396985 | 0.0387976 |
| 177 | 0.884422111 | 0.002114135 | 0.884422111 | 0.037515919 |
| 178 | 0.889447236 | 0.002216085 | 0.889447236 | 0.036206447 |
| 179 | 0.894472362 | 0.002302378 | 0.894472362 | 0.034869005 |
| 180 | 0.899497487 | 0.002372733 | 0.899497487 | 0.03350341 |
| 181 | 0.904522613 | 0.002426868 | 0.904522613 | 0.03210948 |
| 182 | 0.909547739 | 0.002464503 | 0.909547739 | 0.030687035 |
| 183 | 0.914572864 | 0.002485357 | 0.914572864 | 0.029235893 |
| 184 | 0.91959799 | 0.002489148 | 0.91959799 | 0.027755872 |
| 185 | 0.924623116 | 0.002475595 | 0.924623116 | 0.026246792 |
| 186 | 0.929648241 | 0.002444418 | 0.929648241 | 0.02470847 |
| 187 | 0.934673367 | 0.002395336 | 0.934673367 | 0.023140725 |
| 188 | 0.939698492 | 0.002328067 | 0.939698492 | 0.021543376 |
| 189 | 0.944723618 | 0.00224233 | 0.944723618 | 0.019916241 |
| 190 | 0.949748744 | 0.002137845 | 0.949748744 | 0.018259139 |
| 191 | 0.954773869 | 0.00201433 | 0.954773869 | 0.016571888 |
| 192 | 0.959798995 | 0.001871505 | 0.959798995 | 0.014854307 |
| 193 | 0.964824121 | 0.001709088 | 0.964824121 | 0.013106215 |
| 194 | 0.969849246 | 0.001526799 | 0.969849246 | 0.011327429 |
| 195 | 0.974874372 | 0.001324356 | 0.974874372 | 0.009517769 |
| 196 | 0.979899497 | 0.001101478 | 0.979899497 | 0.007677053 |
| 197 | 0.984924623 | 0.000857885 | 0.984924623 | 0.0058051 |
| 198 | 0.989949749 | 0.000593294 | 0.989949749 | 0.003901727 |
| 199 | 0.994974874 | 0.000307427 | 0.994974874 | 0.001966754 |
| 200 | 1 | 0 | 1 | 0 |

In an aspect, the cartesian coordinate values of X and Y are non-dimensional values from 0 to 1. In general, non-dimensional values may not present a particular unit. Further, the above mentioned non-dimensional values of X and Y are convertible to dimensional values by multiplying the cartesian coordinate values of X and Y by the chord length 'L' of the airfoil 106.

In an example of the present disclosure, the airfoil 106 is tested under a plurality of test conditions, using computational fluid dynamics (CFD) analysis. In other words, the airfoil 106 used in the testing is similar to the airfoil 106 of FIG. 1B. As such, the airfoil 106 has the leading edge 112 and the trailing edge 114, and the leading edge 112 has the shape that generates the attached oblique shockwave around the airfoil 106 under the supersonic condition. The airfoil 106 has the thickness 'T', the chord length 'L', and the thickness-to-chord ratio of about 10%. Further, the airfoil 106 has the cross-sectional area 'A' that adheres to NACA 64a210 and weight that adheres to NACA 64a210. Furthermore, the airfoil 106 has the angle-of-attack of about 2° and the Mach number of 2.5. However, in some embodiments, the airfoil 106 has the angle-of-attack of about 9.3908° and the Mach number between 1.5 and 2.5.

Further, CFD analysis is carried out to verify a performance of the airfoil 106 as disclosed in the present disclosure. In general, a CFD model is governed by principles of mass, momentum, and energy conservation in addition to turbulent flow model. According to the present disclosure, the turbulent flow model is assumed to be steady-state and compressible. Continuity equation describes mass conservation. Equation provided below indicates that mass inflow rate is equivalent to mass outflow rate. This principle provides a balance between the mass inflow and the mass outflow within the turbulent flow model, keeping overall mass constant.

$$\nabla \cdot (\rho v) = 0$$

Similarly, momentum conservation equation is provided. In general, momentum conservation defines that a change in momentum of a body is equivalent to net force acting upon it.

$$\nabla \cdot (\rho v v) = -\nabla P + \nabla \tau_{ij} + \rho f$$

Furthermore, energy conservation equation is provided. In general, conservation of energy states that combined rates of heat transfer into control volume and work done on a system are equal to net change in energy of the system. The energy conservation equation refers to fundamental relationships between one or more energy sources in the turbulent flow model.

$$\nabla \cdot (\rho h v) = -\nabla \cdot (Pv) + \rho \dot{q} + \rho (f \cdot v) + \nabla (\tau_{ij} v)$$

The symbols used in the above mentioned equations are described herein. In particular, $\rho$ refers to density (kg/m$^3$), $\dot{q}$ refers to heat transfer rate (kW/kg), h refers to static enthalpy (KJ/kg), f refers to body forces vector $\in \mathbb{R}^3$ (kN/kg), t refers to stress tensor, and v refers to velocity vector $\in \mathbb{R}^3$ (m/s).

According to the present disclosure, turbulent flow model k–ω shear stress transport (SST) and Spalart-Allmaras (SA) are tested. Fundamental idea behind the k–ω SST model is to preserve precise and reliable formulation of the k–ω model in near wall boundary while utilizing freestream independence of a k–ε model in an outer region of a boundary-layer. The k–ε model is converted into a k–ω formulation to accomplish this. The additional cross-diffusion element that appears in the ω–equation and the different modelling constants distinguish the present formulation from the original k–ω model. The turbulent flow model is a two-equation model. Further, standard pressure far-field boundary operation condition is used for the present disclosure. As such, the airfoil 106 is investigated using multiple values of Mach number such as, but not limited to, Mach 1.5, Mach 2, and Mach 2.5. In addition, for each Mach number, values of the angle-of-attack (AOA) are scanned from 0° to 20°. Moreover, the airfoil 106 is assessed under a plurality of scenarios to determine performance parameters.

Figure 3:
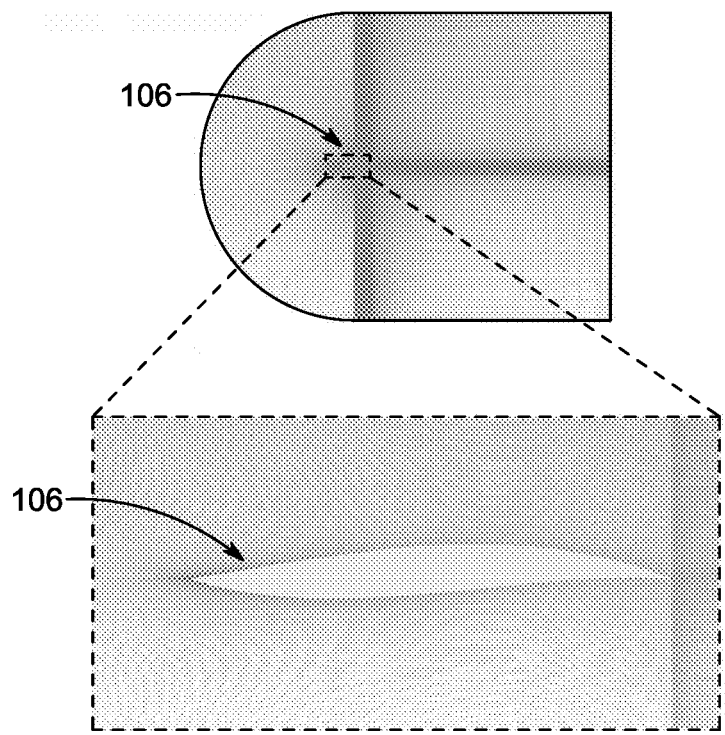
FIG. 3 is a schematic diagram of a mesh shape and sizing of the airfoil, according to certain embodiments.

Referring to FIG. 3, schematic illustrations of a mesh shape and sizing for the airfoil 106 are illustrated, according to certain embodiments. In particular, under typical pressure far-field boundary circumstances, two-dimensional conventional C-shaped domain is discretized into the mesh, subsequently, grid independence is examined. Inlet Mach number is set to 2, inlet temperature is set to 300 Kelvin (K), and far pressure is set at 101.3 kilo pascals (kPa). Further, lift and drag coefficients are calculated for four meshes with varied element counts of 111900, 260200, 302940, and 314600, respectively, in order to determine sensitivity of results to mesh density. Table 2 provides an overview of these mesh study scenarios.

TABLE 2

Mesh independence study with different number of elements at fixed AOA of 0°, and Mach number of 2.

| Case No. | No. of elements | Lift coefficient | Drag coefficient |
|---|---|---|---|
| 1 | 111900 | −0.02125871 | 0.047525143 |
| 2 | 260200 | −0.020759676 | 0.047704905 |
| 3 | 302940 | −0.020706325 | 0.047727085 |
| 4 | 314600 | −0.020689627 | 0.047746351 |

Figure 4A:
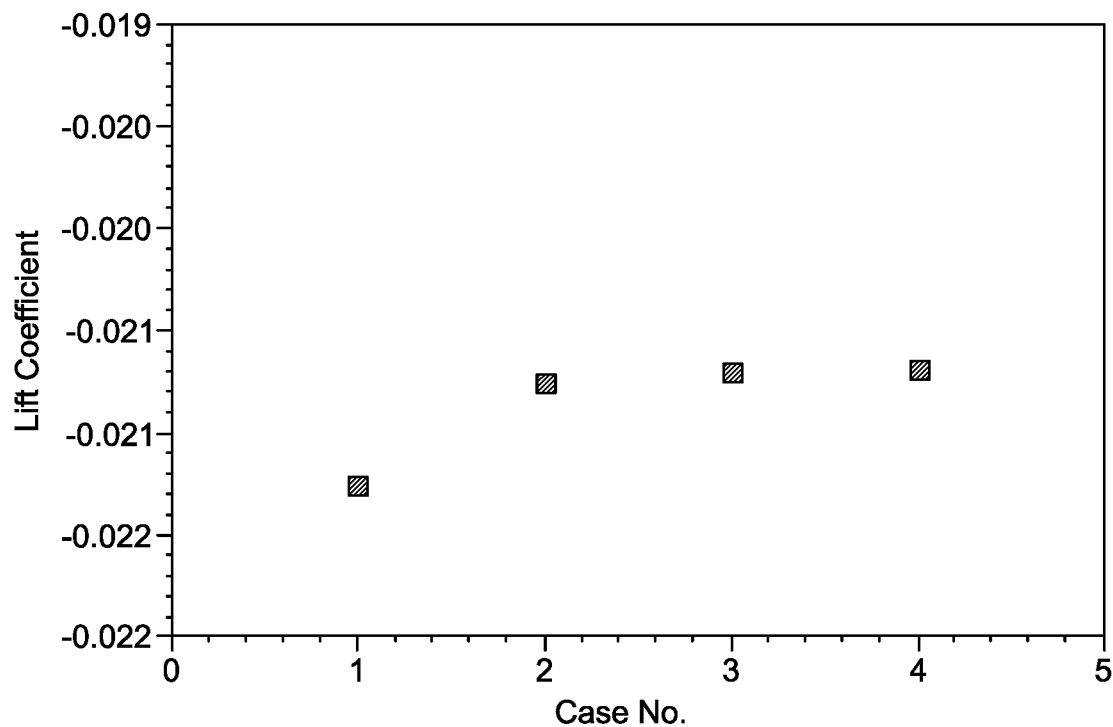
FIG. 4A is a graph showing lift coefficients for a meshing case of the airfoil, according to certain embodiments.
Figure 4B:
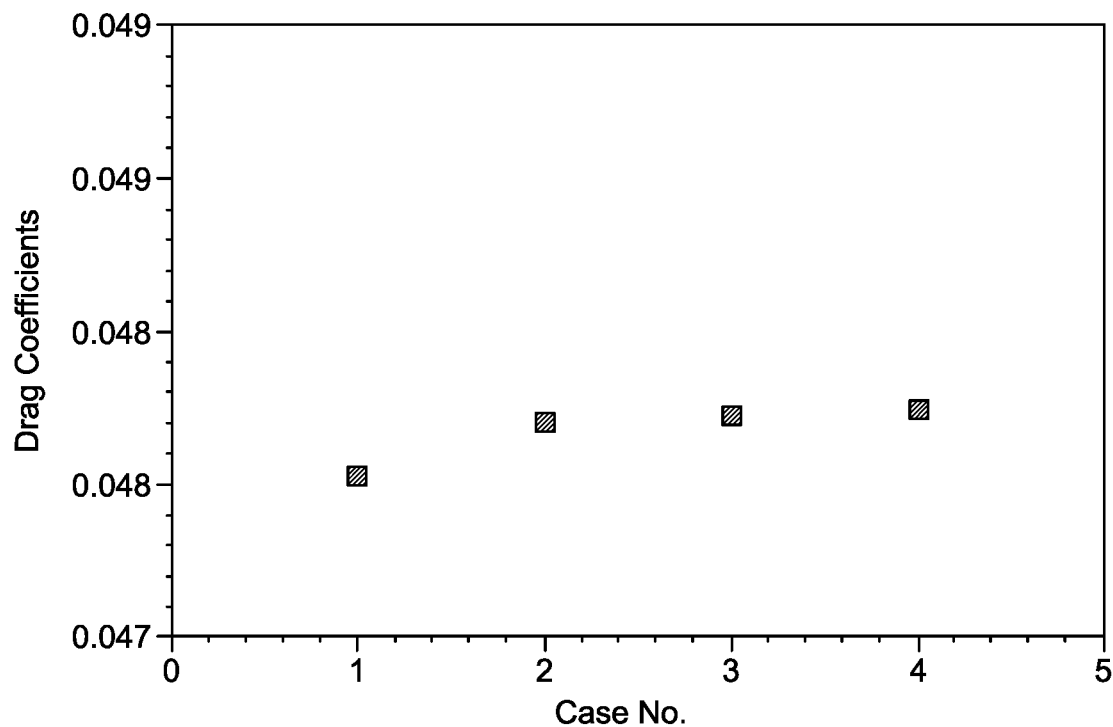
FIG. 4B is a graph showing drag coefficients for a meshing case of the airfoil, according to certain embodiments.

Referring to FIG. 4A and FIG. 4B, graphical representations of lift coefficient and drag coefficient for meshing case is illustrated, according to certain embodiments. In particular, changes in values of the lift coefficient and the drag coefficient for different scenarios are found to be within acceptable range of error.

Figure 5:
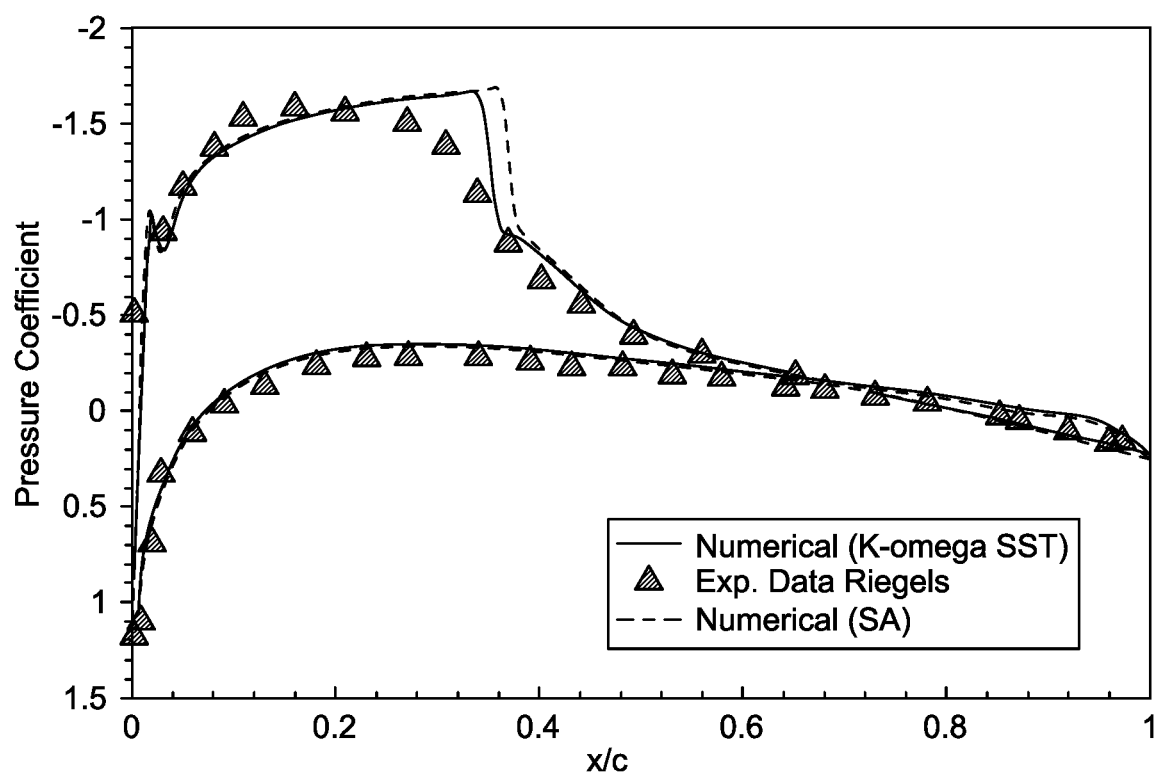
FIG. 5 is a graph showing pressure coefficient validation of the airfoil, according to certain embodiments.

Referring to FIG. 5, a graphical representation of pressure coefficient validation against experimental results is illustrated, according to certain embodiments. In particular, to validate the present turbulent flow model, experimental data of NACA 0015 airfoil is utilized at free stream Mach number of 0.702 with sonic flow over wings and the angle-of-attack of about −4°. As can be seen from FIG. 5, the present results are compared to experimental data in terms of pressure coefficient values.

Figure 6A:
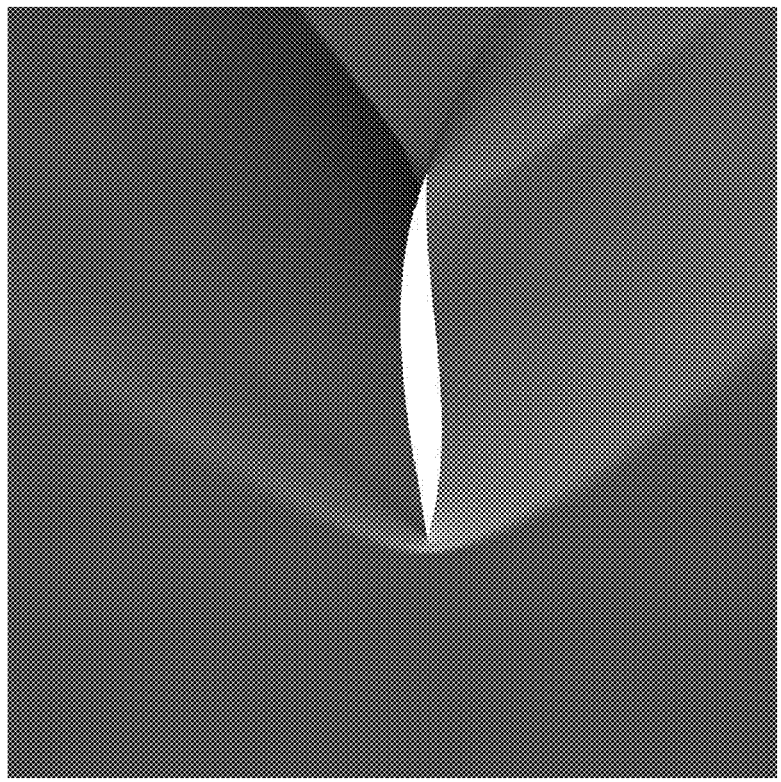
FIG. 6A shows a pressure contour plot for the airfoil at Mach number of 1.5, and an angle of attack (AOA) of 0°, according to certain embodiments.
Figure 6B:
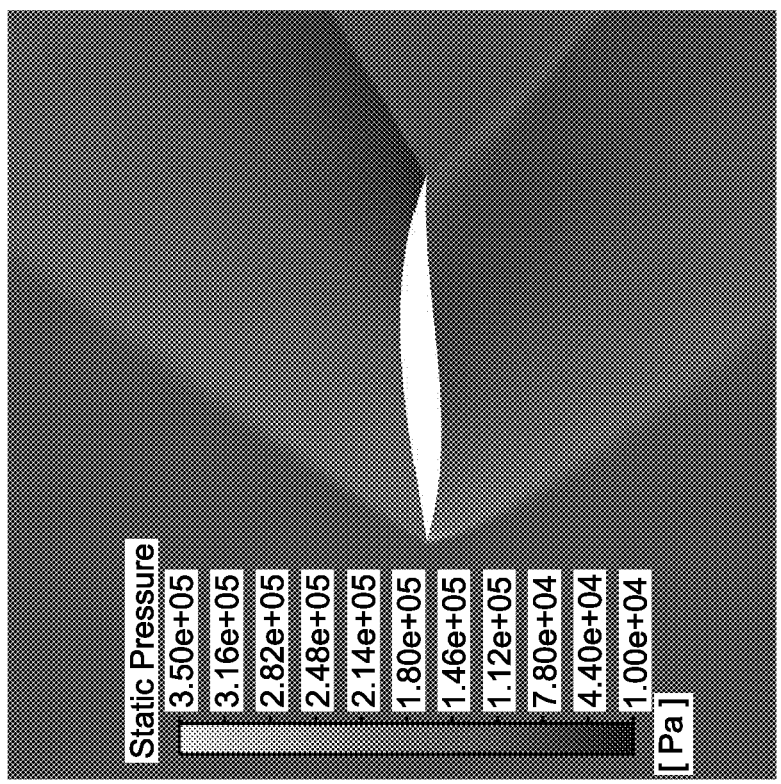
FIG. 6B shows a pressure contour plot for the airfoil at the Mach number of 1.5 and AOA of 9°, according to certain embodiments.
Figure 6D:
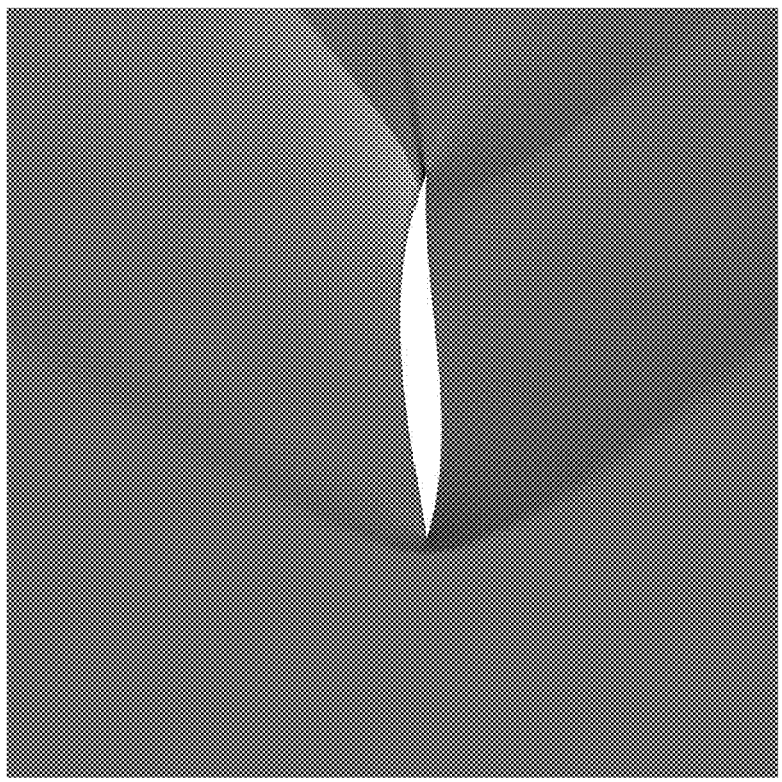
FIG. 6D shows a Mach number contour plot for the airfoil at the Mach number of 1.5 and the AOA of 9°, according to certain embodiments.
Figure 6C:
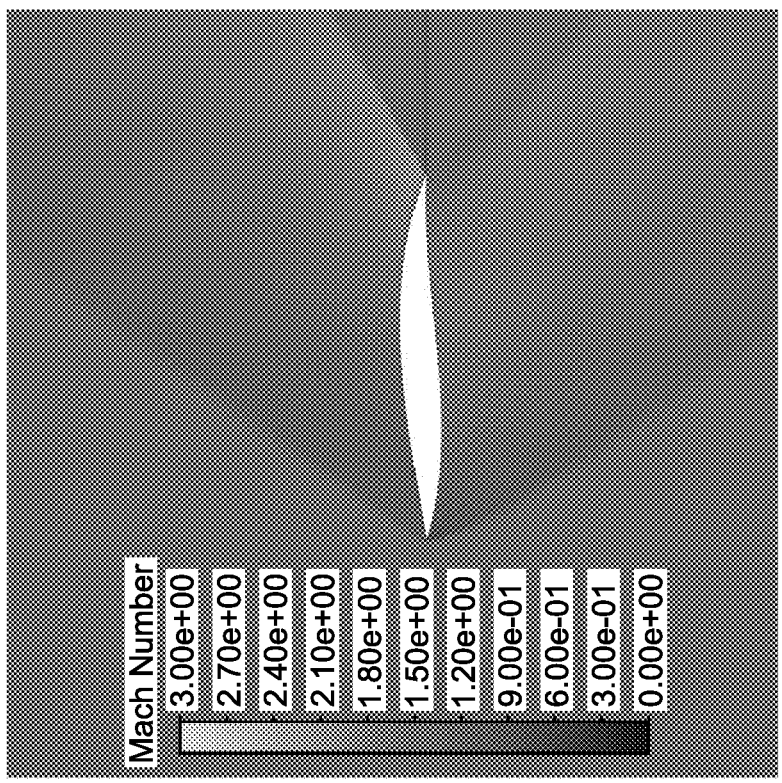
FIG. 6C shows a Mach number contour plot for the airfoil at the Mach number of 1.5 and the AOA of 0°, according to certain embodiments.
Figure 6F:
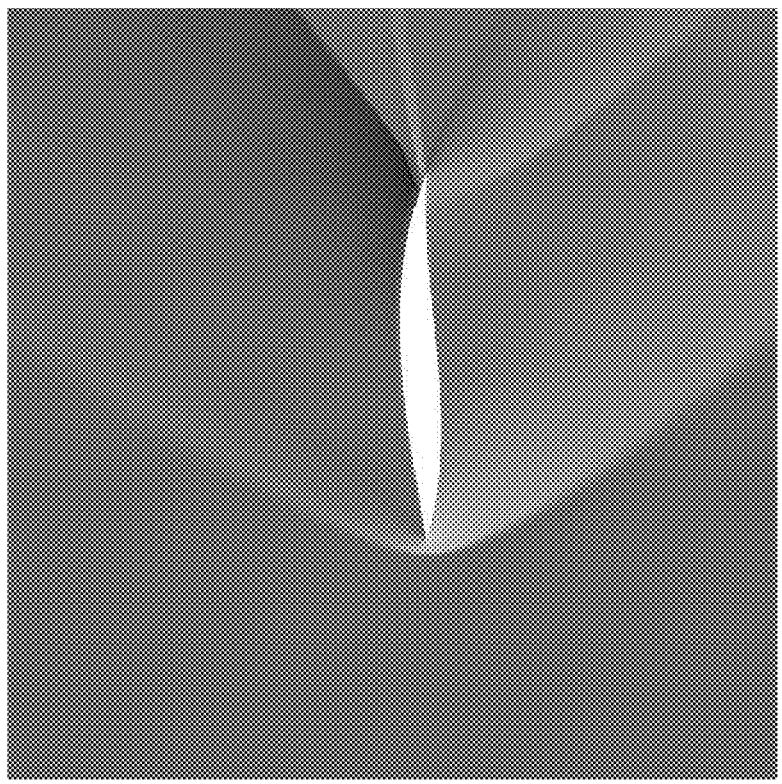
FIG. 6F shows a temperature contour plot for the airfoil at the Mach number of 1.5 and the AOA of 9°, according to certain embodiments.
Figure 6E:
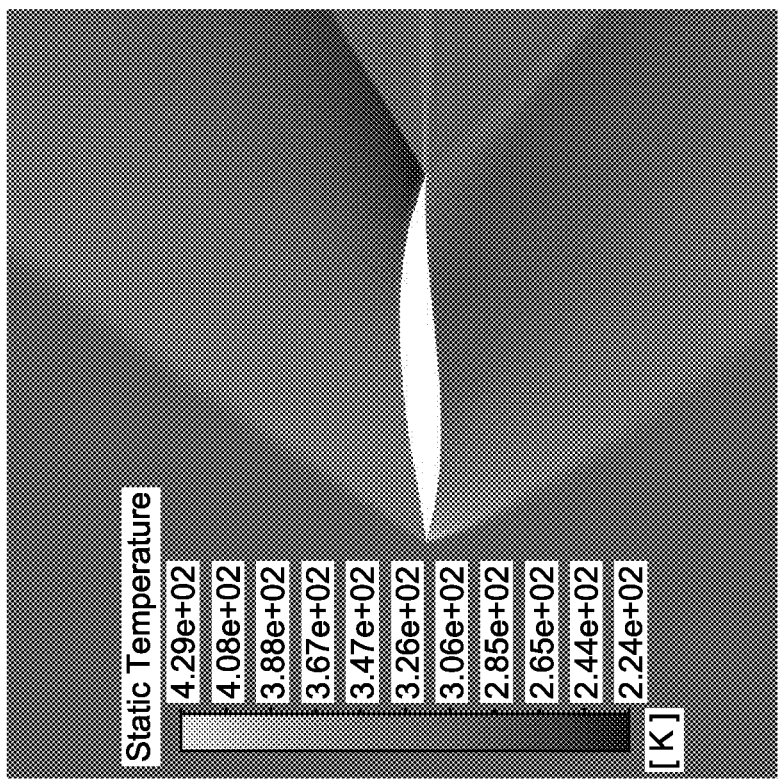
FIG. 6E shows a temperature contour plot for the airfoil at the Mach number of 1.5 and the AOA of 0°, according to certain embodiments.

Referring to FIG. 6A to FIG. 6F, contour plots of velocity, temperature, and pressure of the airfoil 106, operating at a Mach number of 1.5, are illustrated, according to certain embodiments. In particular, FIG. 6A and FIG. 6B illustrate contour plots of the pressure on the airfoil 106 at the angle-of-attack of 0° and 9°, respectively. FIG. 6C and FIG. 6D illustrate contour plots of the Mach number of the airfoil 106 at the angle-of-attack of 0° and 9°, respectively. FIG. 6E and FIG. 6F illustrate contour plots for the temperature of the airfoil 106 at the angle-of-attack of 0° and 9°, respectively. As can be seen from FIG. 6B, FIG. 6D, and FIG. 6F, the velocity values are higher above the airfoil for the angle-of-attack of 9°, due to more sucking and more pressure generated at the lower surface 110 of the airfoil 106 since the lower surface 110 faces direct air-flow. Further, as can be seen from FIG. 6A, FIG. 6C, and FIG. 6E, the angle-of-attack is kept at 0° and the oblique shockwaves appear over the upper surface 108 and the lower surface 110, starting from the leading edge 112 of the airfoil 106. Furthermore, an expansion shockwave appears with airfoil curvature on the upper surface 108 closer to the trailing edge 114, helping in increasing the velocity to generate lift.

Figure 7B:
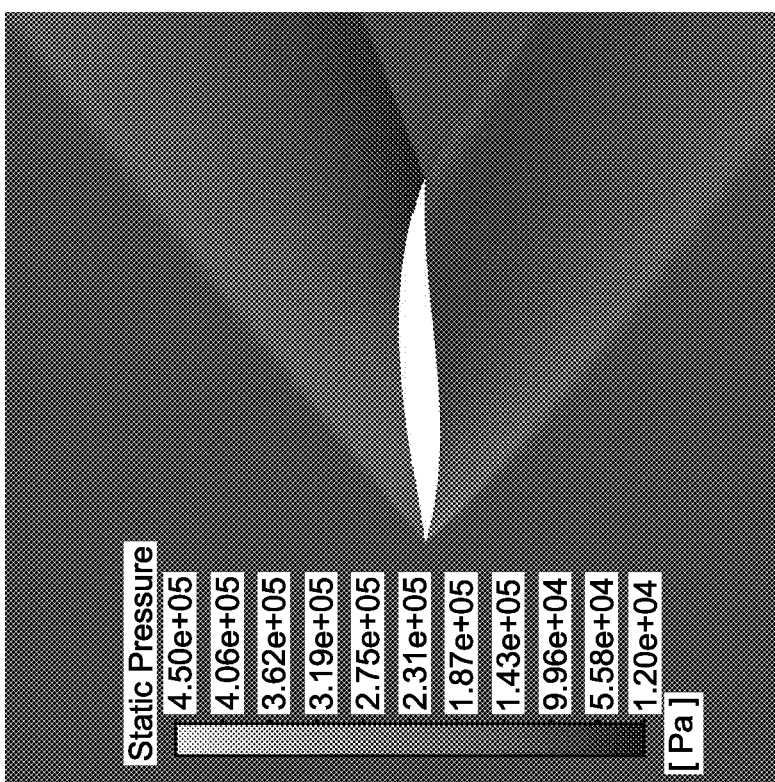
FIG. 7B shows a pressure contour plot for the airfoil with the operating Mach number of 2.0 and the AOA of 9°, according to certain embodiments.
Figure 7A:
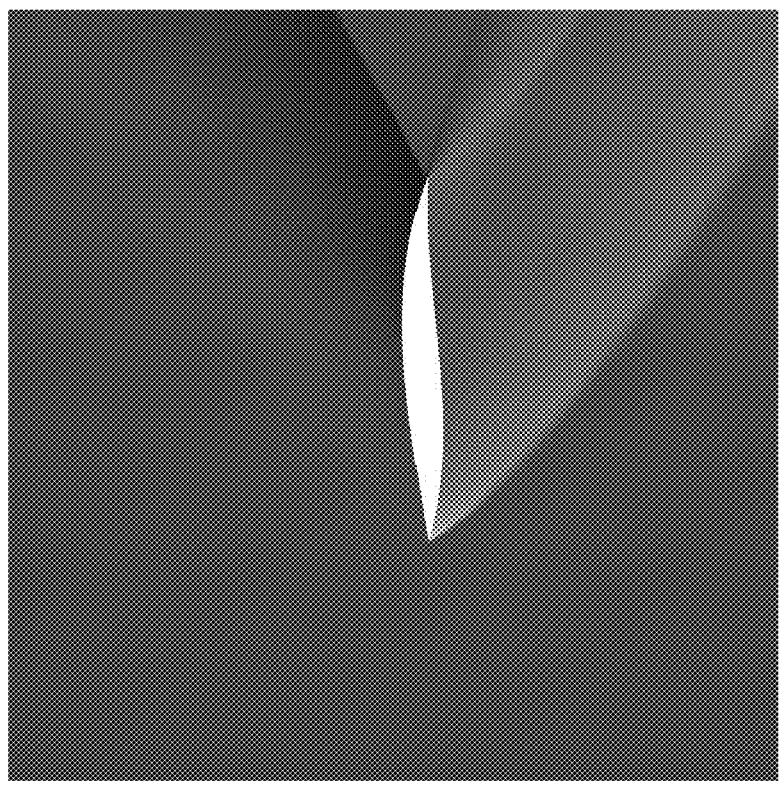
FIG. 7A shows a pressure contour plot for the airfoil with an operating Mach number of 2.0 and the AOA of 0°, according to certain embodiments.
Figure 7C:
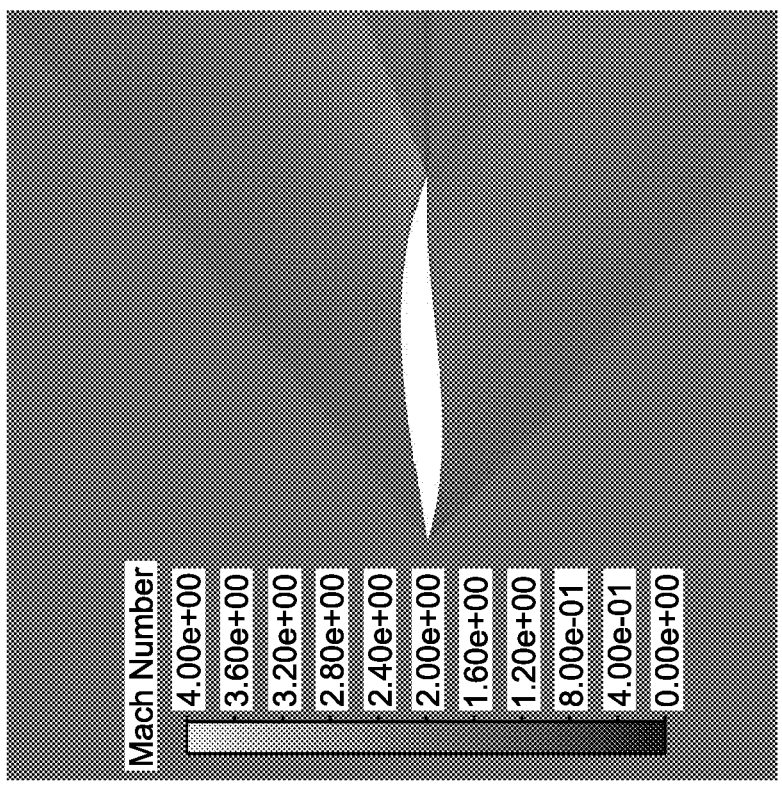
FIG. 7C shows a Mach number contour plot for the airfoil with the operating Mach number of 2.0 and the AOA of 0°, according to certain embodiments.
Figure 7D:
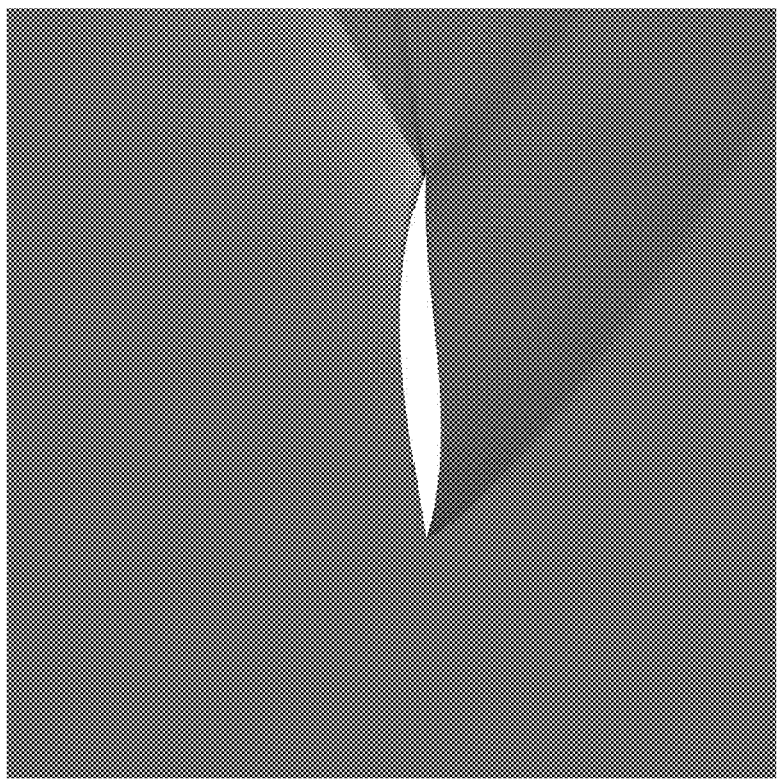
FIG. 7D shows a Mach number contour plot for the airfoil with the operating Mach number of 2.0 and the AOA of 9°, according to certain embodiments.
Figure 7F:
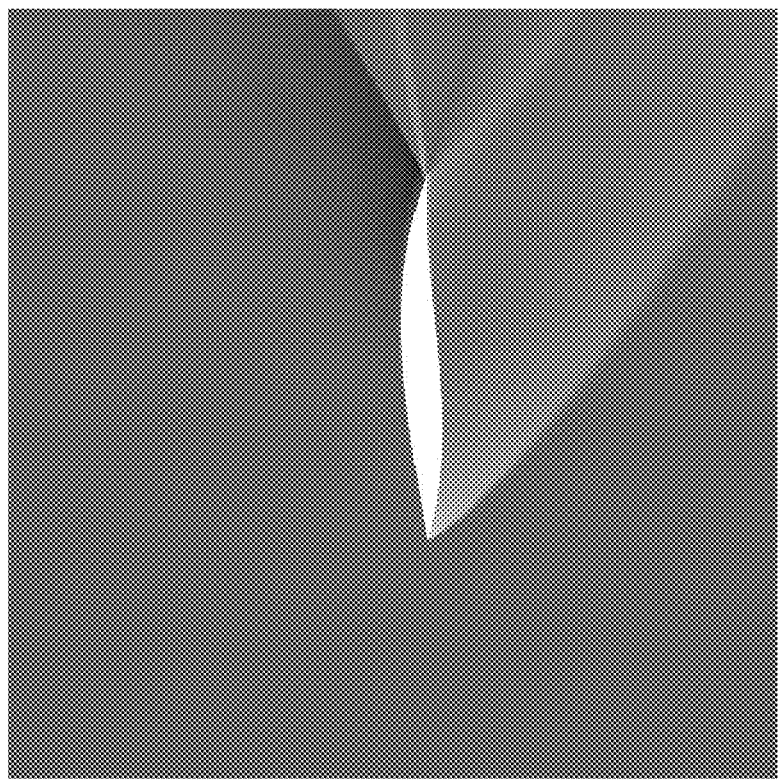
FIG. 7F shows a temperature contour plot for the airfoil with the operating Mach number of 2.0 and the AOA of 9°, according to certain embodiments.
Figure 7E:
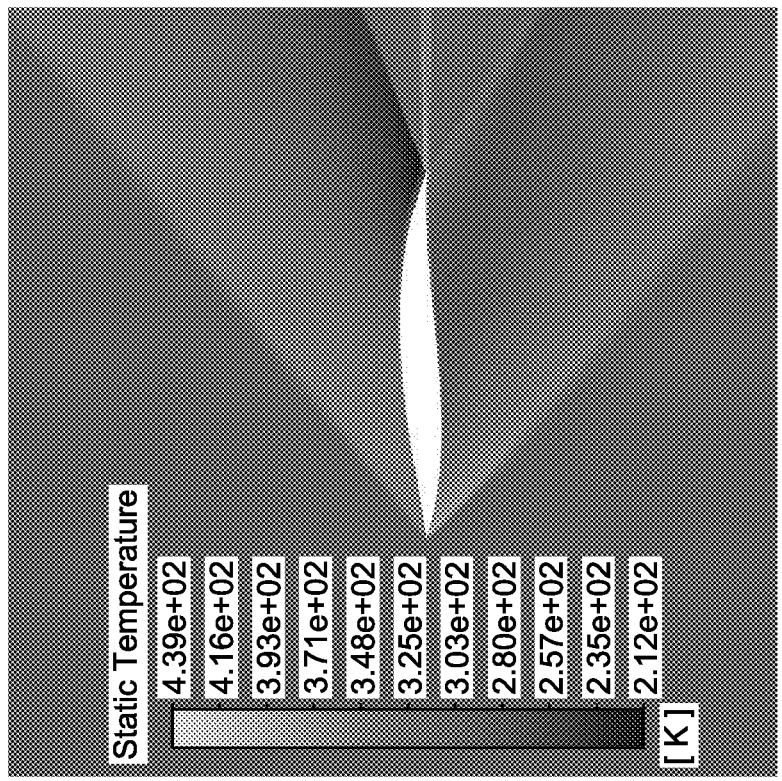
FIG. 7E shows a temperature contour plot for the airfoil with the operating Mach number of 2.0 and the AOA of 0°, according to certain embodiments.

Referring to FIG. 7A to FIG. 7F, contour plots of velocity, temperature, and pressure of the airfoil 106, operating at a Mach number of 2.0, are illustrated, according to certain embodiments. In particular, FIG. 7A and FIG. 7B illustrate contour plots of the pressure on the airfoil 106 at an angle-of-attack of 0° and 9°, respectively. FIG. 7C and FIG. 7D illustrate contour plots of the Mach number of the airfoil 106 at the angle-of-attack of 0° and 9°, respectively. FIG. 7E and FIG. 7F illustrate contour plots for the temperature of the airfoil 106 at the angle-of-attack of 0° and 9°, respectively. As can be seen from FIG. 7B, FIG. 7D, and GIF. 7F, the velocity values are higher above the airfoil for the angle-of-attack of 9°, due to more sucking and more pressure generated at the lower surface 110 of the airfoil 106 since the lower surface 110 faces direct air-flow. Further, as can be seen from FIG. 7A, FIG. 7C, and FIG. 7E, the angle-of-attack is kept at 0° and the oblique shockwaves appear over the upper surface 108 and the lower surface 110, starting from the leading edge 112 of the airfoil 106. Furthermore, an expansion shockwave appears with airfoil curvature on the upper surface 108 closer to the trailing edge 114, helping in increasing the velocity to generate lift. Moreover, it may be noted that as the Mach number increases, the oblique shockwave angle gets smaller. In an example, at the leading edge 112, a deflection angle is held fixed as they both experience the same angle-of-attack; however, the Mach number changes from 1.5 to 2.0. Thus, this corresponds to a less oblique shockwave angle.

As can be seen from FIGS. 6C-6D, and FIGS. 7C-7D, due to the occurrence of the oblique shockwave, the pressure is high around the airfoil 106, closer to the leading edge 112 for the angle-of-attack of 0°. Similarly, the pressure is high under the lower surface 110 of the airfoil 106 for the angle-of-attack of 9°. However, the pressure is very low over the upper surface 108 for the angle-of-attack of 9° due to expansion waves, which helps to produce more lift. In particular, for any angle-of-attack of greater than 0°, it is expected to have a similar distribution of oblique and expansion waves over the airfoil 106 as the distribution for 9° angle-of-attack, with different values and different shock angles. Moreover, as can be seen from FIGS. 6D-6E, and FIGS. 7D-7E, the temperature values are high for low-velocity values in the case of expansion waves under the lower surface 110, when the angle of attack is greater than 0°. In addition, the maximum temperature is generated at the leading edge 112 due to stagnation. In some aspects, temperature rises at the trailing edge 114 due to generation of a new oblique shockwave, which may reduce the lift profile.

Figure 8B:
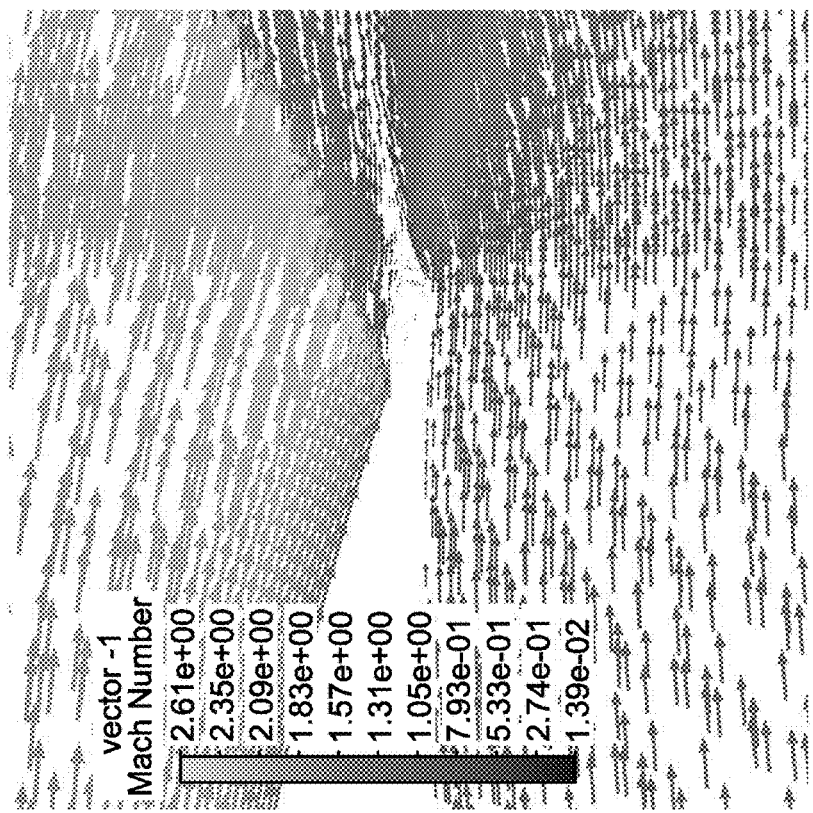
FIG. 8B shows a flow behavior at a trailing edge of the airfoil, at the operating Mach number of 1.5 and the AOA of 9°, according to certain embodiments.
Figure 8A:
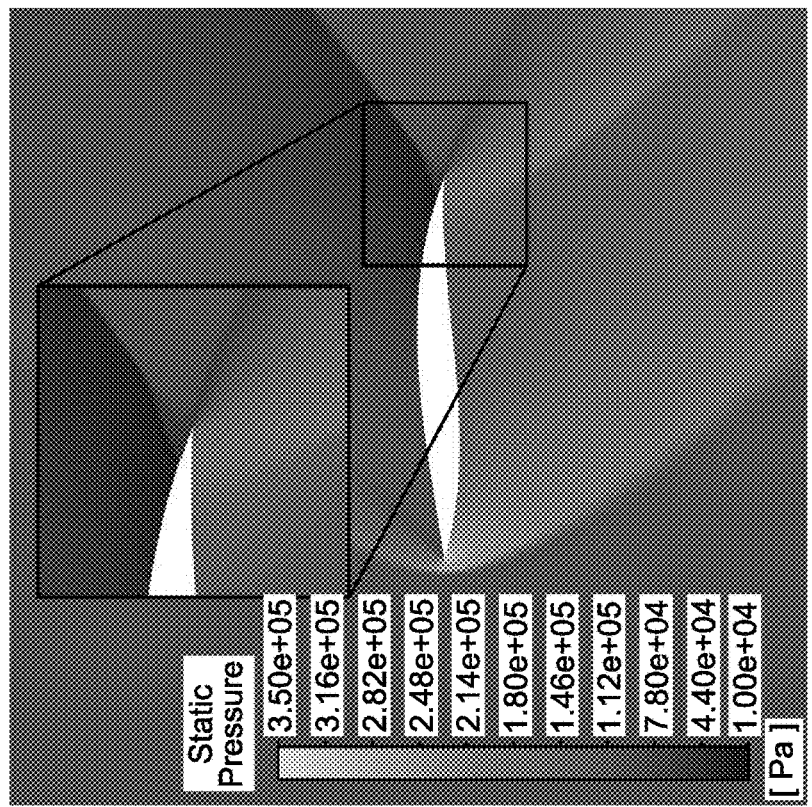
FIG. 8A shows a pressure contour plot for the airfoil with an operating Mach number of 1.5 and AOA of 9°, according to certain embodiments.
Figure 9B:
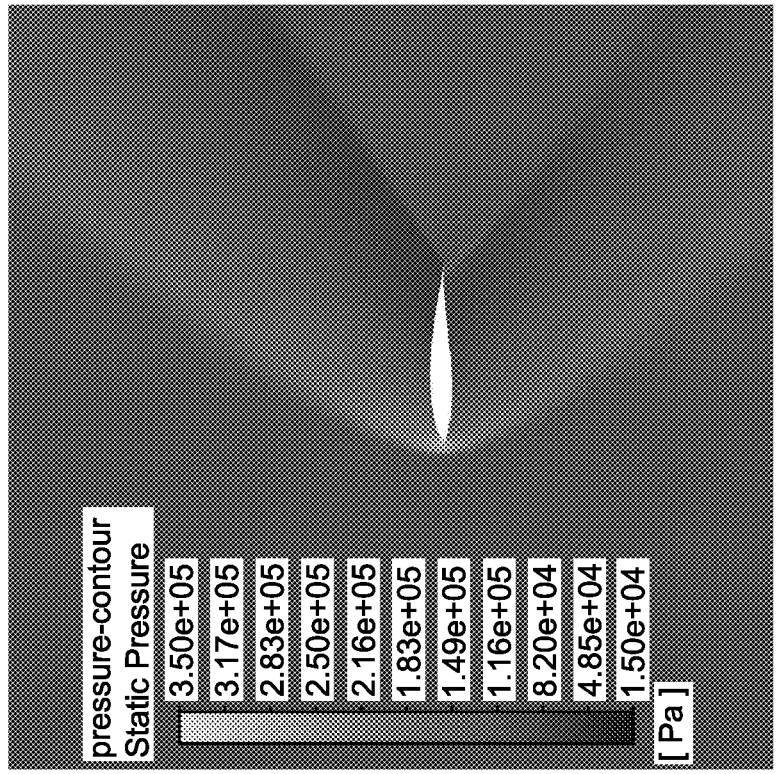
FIG. 9B shows a pressure contour plot for the NACA 64a210 airfoil geometry at the Mach number of 1.5 and the AOA of 0°, according to certain embodiments.
Figure 9A:
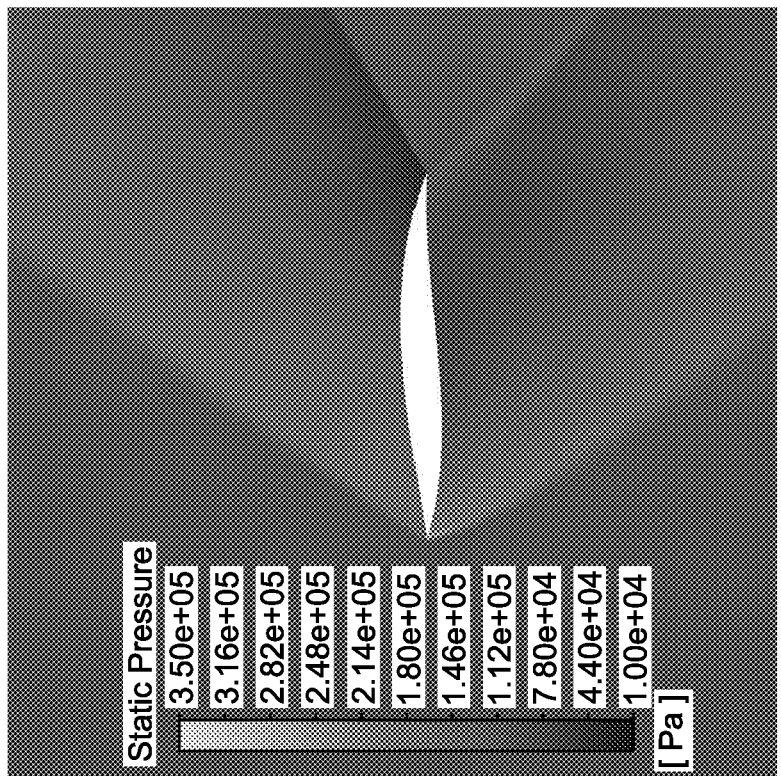
FIG. 9A shows a pressure contour plot for the airfoil at Mach number of 1.5 and AOA of 0°, according to certain embodiments.
Figure 9D:
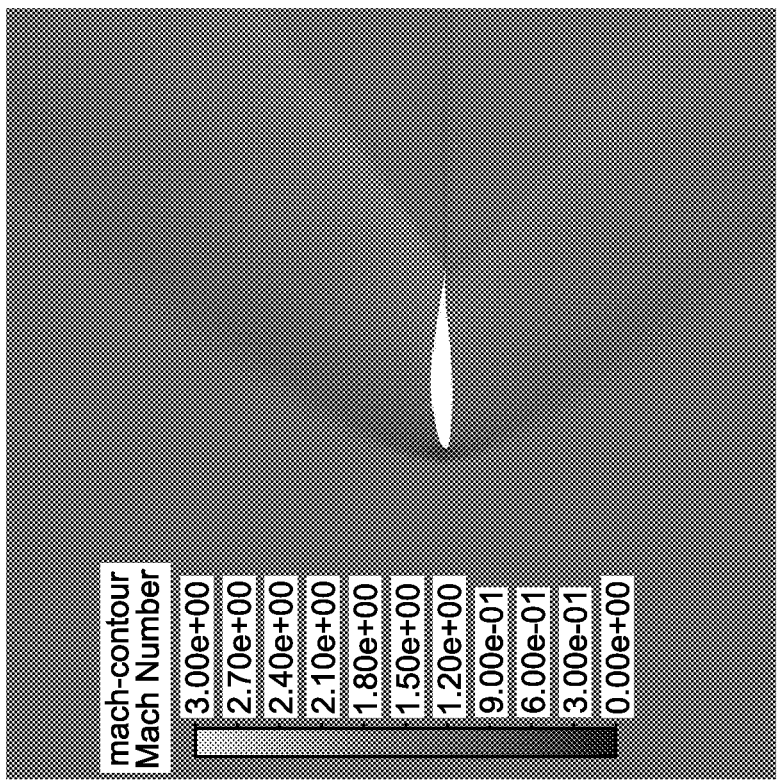
FIG. 9D shows a Mach number contour plot for the NACA 64a210 airfoil geometry at the Mach number of 1.5 and the AOA of 0°, according to certain embodiments.
Figure 9C:
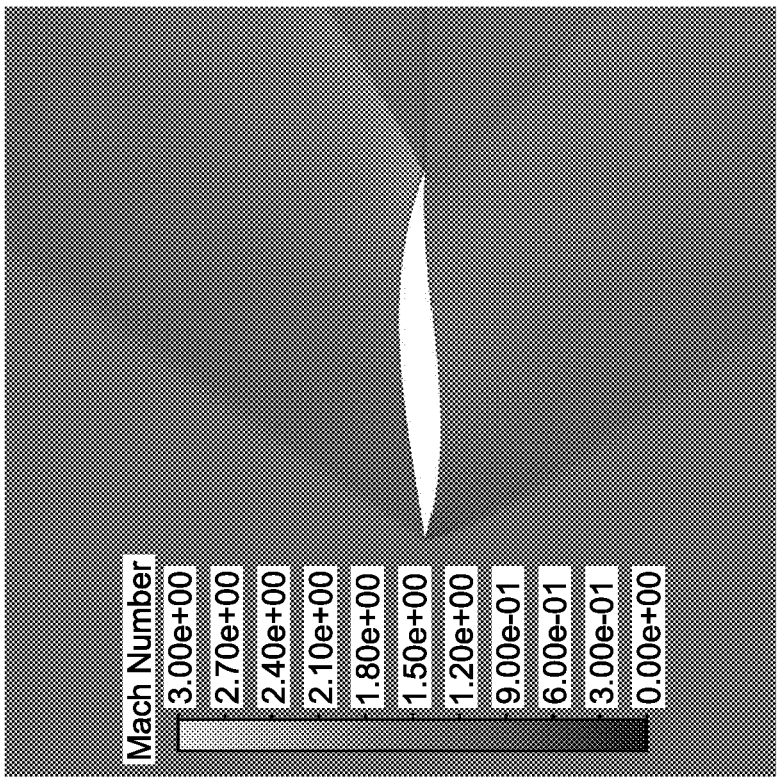
FIG. 9C shows a Mach number contour plot for the airfoil at the Mach number of 1.5 and the AOA of 0°, according to certain embodiments.
Figure 9F:
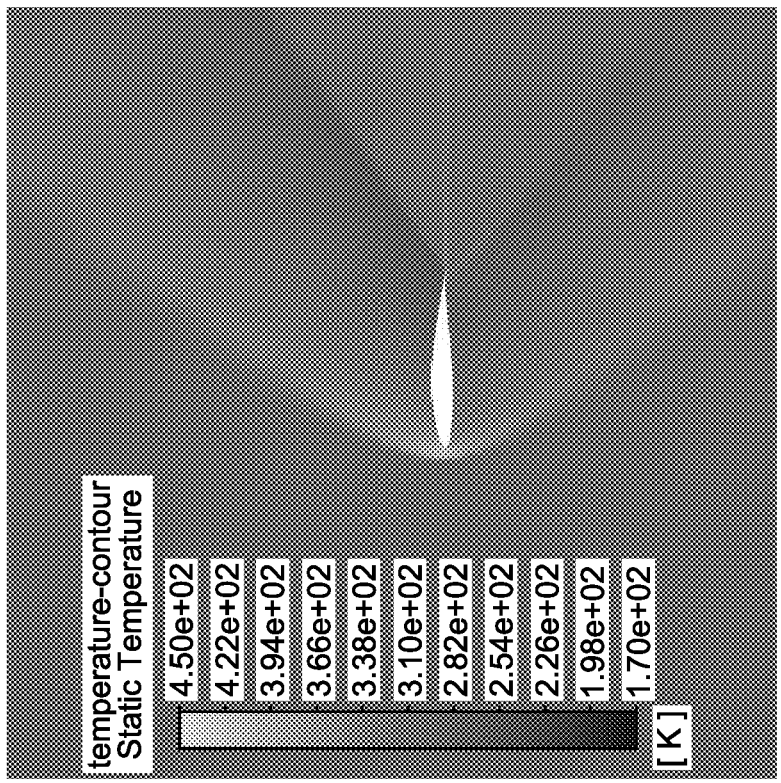
FIG. 9F shows a temperature contour plot for the NACA 64a210 airfoil geometry at the Mach number of 1.5 and the AOA of 0°, according to certain embodiments.
Figure 9E:
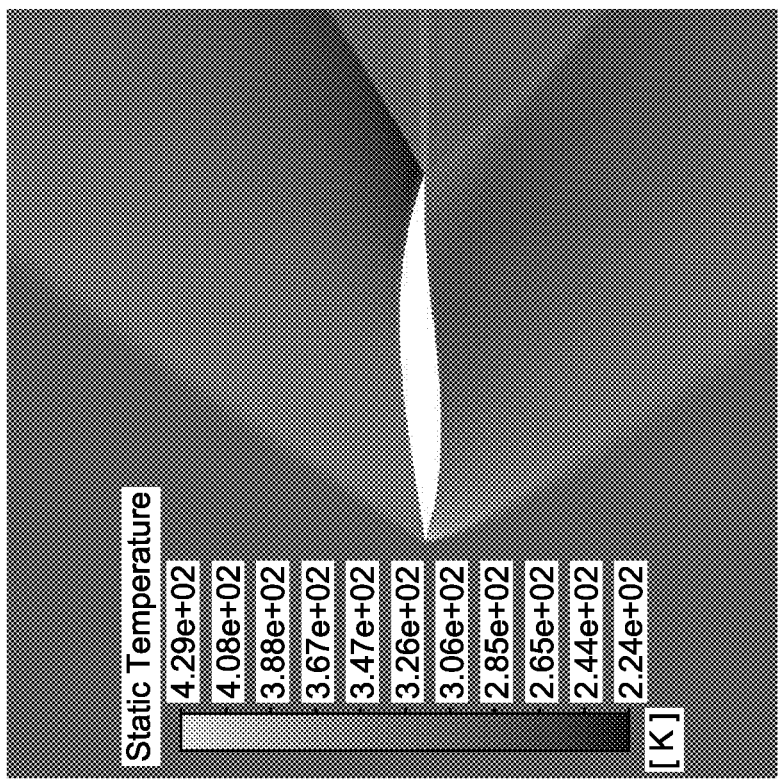
FIG. 9E shows a temperature contour plot for the airfoil at the Mach number of 1.5 and the AOA of 0°, according to certain embodiments.

Referring to FIG. 8A and FIG. 8B, for the angle-of-attack of 9°, an oblique shockwave under the lower surface 110 and an expansion wave over the upper surface 108 are observed. The oblique shockwave and the expansion wave may generate more lift and subsequently more drag. Further, a behavior of the flow around the airfoil 106 shows a localized region of flow separation at the trailing edge 114 starts to appear when the airfoil 106 operates at Mach number of 1.5. As can be seen from FIG. 8A, a slight pressure increase on the upper surface 108 is noted, justified by flow circulation at the upper surface 108 of the airfoil 106 shown in FIG. 8B. Furthermore, as can be seen from FIG. 6D, the flow at the upper surface 108 region experiences an early oblique shockwave as a natural adjustment to equate an upper surface pressure with a lower surface pressure, as indicated by a slip-line. Conversely, the behavior changes with the Mach number of 2.0, as depicted in FIG. 7D. As the Mach number increases, shockwave lags until it takes place at the leading edge 112. The airfoil 106 response to the change in the angle-of-attack in terms of flow separation, as the separation occurs near the trailing edge 114.

Referring to FIGS. 9A-9F, different contour plots for NACA 64a210 airfoil in comparison to the contour plots of airfoil 106 are illustrated, according to certain embodiments. It may be concluded from FIGS. 9A-9F, the NACA 64a210 airfoil experiences a detached shockwave at 0° angle-of-attack, unlike the airfoil 106 as described in the present disclosure. This may be due to a blunt leading edge design of the NACA 64a210 airfoil. Further, for the angle-of-attack of 0° and Mach number of 1.5, the lift-over drag ratio may be different for the airfoil 106 and the NACA 64a210, due to the difference in the kind of shock wave experienced by the two airfoils such as an attached oblique shockwave for the airfoil 106 and a detached shockwave for NACA 64a210 airfoil.

Figure 10A:
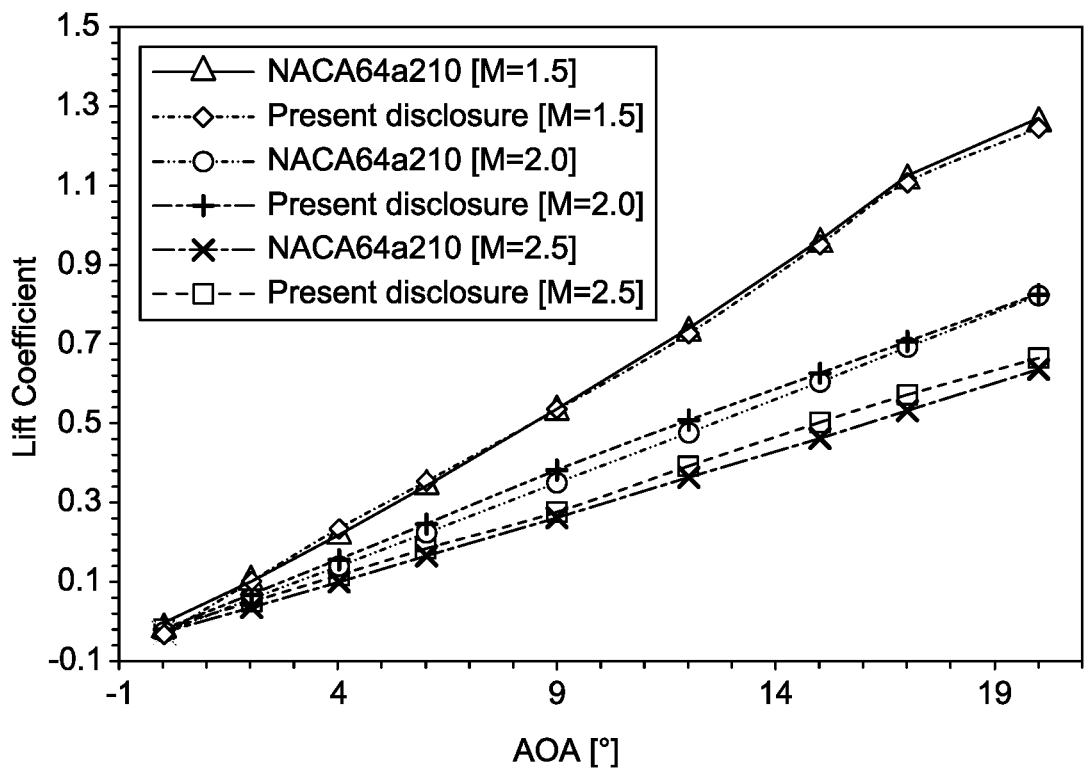
FIG. 10A is a graph showing lift coefficient comparison of the airfoil and the NACA 64a210 airfoil geometry at the Mach numbers of 1.5, 2, and 2.5, according to certain embodiments.
Figure 10B:
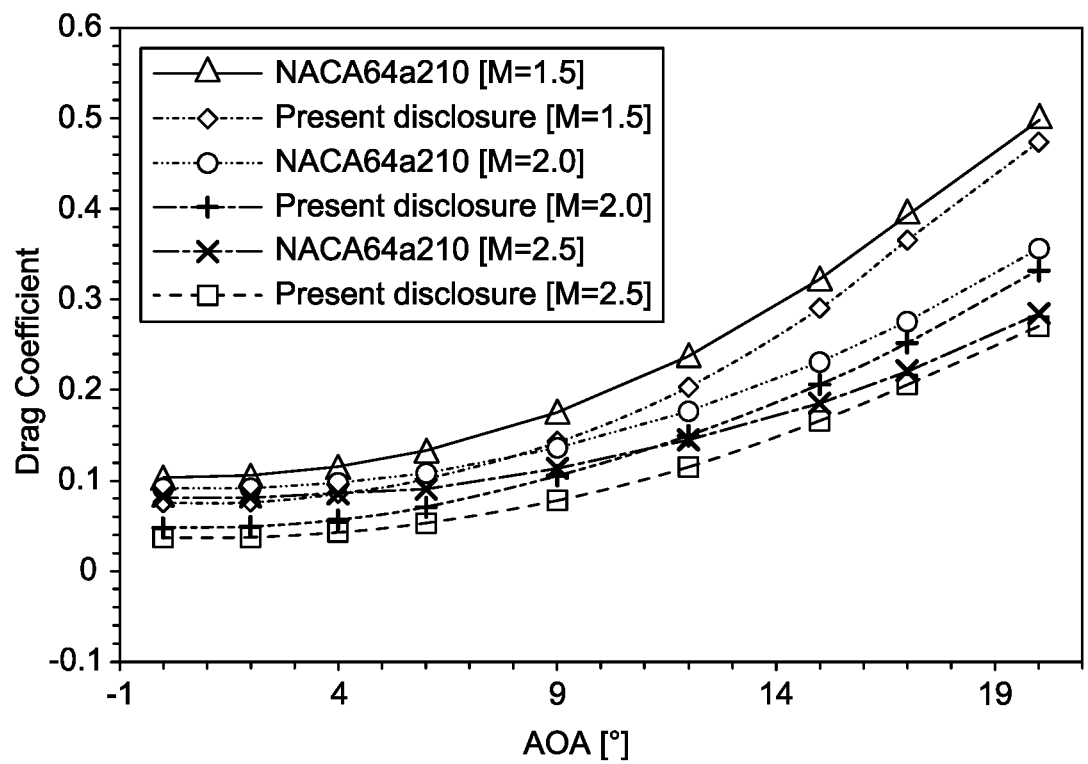
FIG. 10B is a graph showing drag coefficient comparison of the airfoil and the NACA 64a210 airfoil geometry at the Mach numbers of 1.5, 2, and 2.5, according to certain embodiments.
Figure 10C:
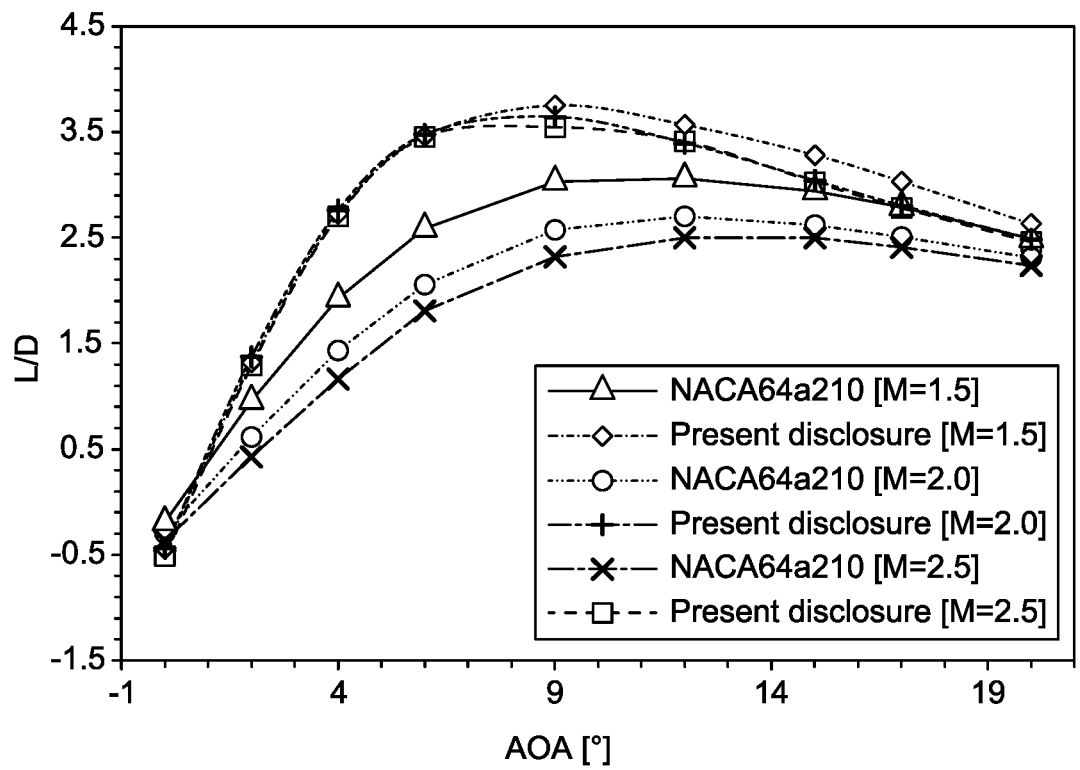
FIG. 10C is a graph showing lift-over-drag ratio comparison of the airfoil and the NACA 64a210 airfoil geometry at the Mach numbers of 1.5, 2, and 2.5, according to certain embodiments.

Referring to FIGS. 10A-10C, details of essential parameters such as lift coefficients, drag coefficients, and lift-over-drag ratio of the airfoil 106 in comparison to the NACA 64a210 are illustrated, according to certain embodiments. In particular, comparative study of the airfoil 106 and the NACA 64a210 airfoil shows that the airfoil 106 may have a notable decrease in drag coefficient throughout an entire space of tested Mach numbers in a supersonic regime and angles of attack. In addition, the lift coefficients may exhibit some enhancements. As can be seen from FIG. 10C, smooth and thin shape of the leading edge 112 of the airfoil 106 compared to the NACA 64a210 airfoil may impact drag reduction. In turn, the lift-over-drag ratio may experience a considerable increase when compared to the NACA 64a210 airfoil. Further, linear flow theory prediction of a lift-over-drag ratio was equal to 3.5039 at an angle of attack of 9.3908° matched comprehensive CFD study and the suitable value of the lift-over-drag is independent of operating Mach number in supersonic flow regime.

Figure 11:
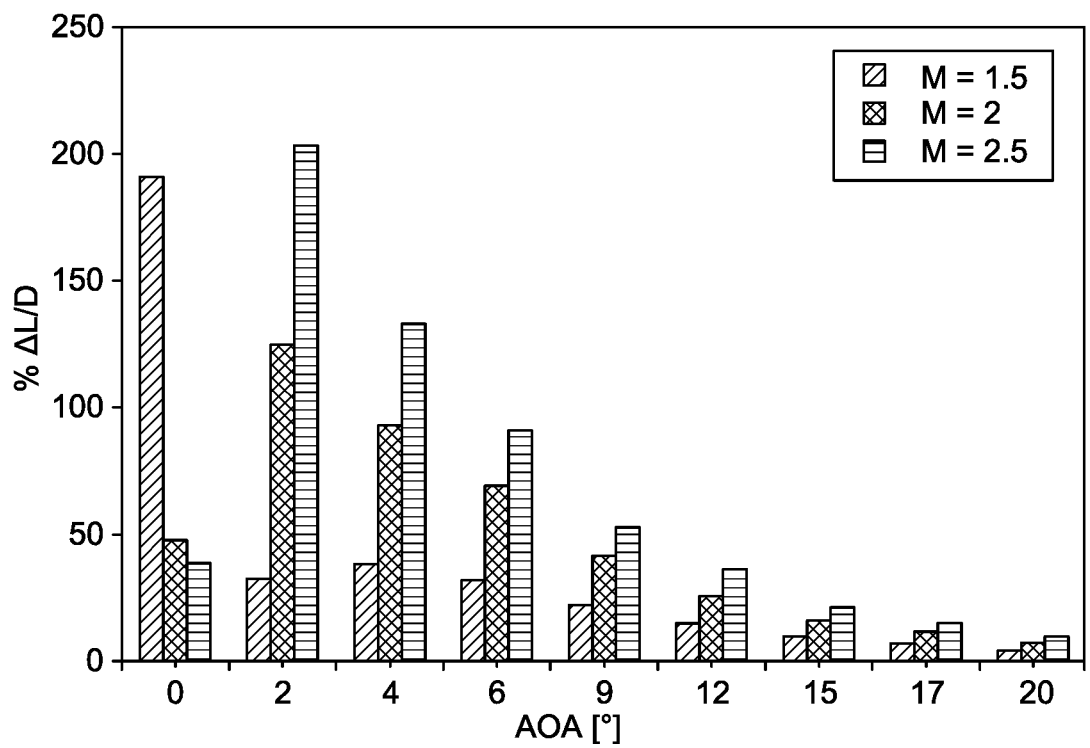
FIG. 11 is a graph showing percentage increase in lift-over-drag ratio of the airfoil geometry in comparison with the NACA 64a210 airfoil geometry at the Mach numbers of 1.5, 2, and 2.5 and different AOAs, according to certain embodiments.

Referring to FIG. 11, percentage increase in the lift-over-drag ratio for the supersonic flow regime of the airfoil 106 in comparison to the NACA 64a210 airfoil is illustrated, according to certain embodiments. It may be noted that, as the angle-of-attack rises, the increment in the lift-to-drag ratio becomes less noticeable and incremental gains in lift start to fall behind high rise in drag value. However, through an entire supersonic flow regime of investigated operating conditions, a significant percentage increase in the lift-over-drag ratio is experienced for the airfoil 106 as compared to the NACA 64a210 airfoil. In an example, the comparison between the airfoil 106 and the NACA 64a210 airfoil showed an increase in lift-over-drag ratio of about 4.4% to 191.1% at Mach number of 1.5, 7.1% to 124.8% at Mach number of 2, and 9.8% to 203.5% at Mach number of 2.5 depending on the angle-of-attack. The lift-over-drag ratio increase is noticed at the angle-of-attack of 9° for different Mach numbers. Thus, the improvement in the lift-over-drag ratio is significant as it may impact energy consumption.

The aspects of the present disclosure describe the airfoil 106 having improved airfoil geometry 107. In particular, the airfoil 106 is designed to reduce fuel consumption and improve efficiency of supersonic aircrafts. Multiple performance parameters of the airfoil 106 are explored by computational fluid dynamic studies using one or more software such as, but not limited to, ANSYS Fluent. Further, results of the airfoil 106 have been compared to those of the conventional airfoils such as, NACA 64a210 airfoil. The NACA 64a210, and the airfoil 106, are investigated over a range of supersonic Mach numbers and at different angle-of-attacks. Under all investigated Mach numbers and angles-of-attacks, the airfoil 106 may outperform the NACA 64a210 airfoil in terms of the lift-over-drag ratio. Furthermore, airfoil 106 as described in the present disclosure substantially enhances the lift-over-drag ratio, mainly by reducing the drag and, to some extent, enhancing the lift due to changes in the geometry and thinning of the leading edge 112. Moreover, with a same weight and area for present airfoil 106 and NACA 64a210 airfoil, there is noticeable improvement in the aerodynamic performance of the airfoil 106 indicating the advantage of present 5 airfoil 106 for supersonic aircrafts.

Numerous modifications and variations of the present disclosure are possible in light of the above teachings. It is therefore to be understood that within the scope of the appended claims, the invention may be practiced otherwise than as specifically described herein.

The invention claimed is:

1. A supersonic aircraft having at least two wings, each of the wings having an angle-of-attack of about 9° and an airfoil geometry comprising:
   an upper surface represented by a first polynomial equation having a first coefficient and a second coefficient; and
   a lower surface represented by a second polynomial equation having a third coefficient and a fourth coefficient;
   wherein the upper surface and the lower surface defines a closed airfoil shape,
   wherein the first polynomial equation is
   $$y_u(x) = -(a_1+a_2)x^3 + a_2 x^2 + a_1 x$$
   and the second polynomial equation is
   $$y_l(x) = -(b_1+b_2)x^3 + b_2 x^2 + b_1 x$$
   wherein $y_u$ represents the upper surface and $y_l$ represents the lower surface; wherein $a_1$ is the first coefficient, $a_2$ is the second coefficient, $b_1$ is the third coefficient, and $b_2$ is the fourth coefficient, wherein the first coefficient is about 0.1562, the second coefficient is about 0.0821, the third coefficient is about −0.3058, and the fourth coefficient is about 0.6749.

2. The airfoil of claim 1, wherein the airfoil has a thickness-to-chord ratio of about 10%, and a cross-sectional area that adheres to NACA 64a210.

3. The supersonic aircraft of claim 2, wherein the airfoil has a leading edge and a trailing edge, and wherein the leading edge has a shape that generates an attached oblique shockwave around the airfoil under a supersonic condition.

4. The supersonic aircraft of claim 2, wherein the angle-of-attack is about 9.3908°.

* * * * *